United States Patent
Ojima et al.

(10) Patent No.: US 8,107,012 B2
(45) Date of Patent: Jan. 31, 2012

(54) IMAGE PROCESS APPARATUS AND METHOD FOR CONTOUR CORRECTION

(75) Inventors: Shuichi Ojima, Osaka (JP); Bunpei Toji, Gifu (JP)

(73) Assignee: Panasonic Corporation, Osaka (JP)

( * ) Notice: Subject to any disclaimer, the term of this patent is extended or adjusted under 35 U.S.C. 154(b) by 1307 days.

(21) Appl. No.: 11/666,892

(22) PCT Filed: Nov. 29, 2005

(86) PCT No.: PCT/JP2005/021872
§ 371 (c)(1),
(2), (4) Date: May 3, 2007

(87) PCT Pub. No.: WO2006/057403
PCT Pub. Date: Jun. 1, 2006

(65) Prior Publication Data
US 2008/0002042 A1 Jan. 3, 2008

(30) Foreign Application Priority Data
Nov. 29, 2004 (JP) .................................. 2004-343484

(51) Int. Cl.
*H04N 5/68* (2006.01)
(52) U.S. Cl. ....................................................... 348/625
(58) Field of Classification Search .................. 348/625, 348/607, 26, 666, 533, 606, 609, 618; 382/266, 382/199, 275
See application file for complete search history.

(56) References Cited

U.S. PATENT DOCUMENTS

| 4,393,407 | A | * | 7/1983 | Yokomizo | 348/625 |
| 4,733,300 | A | * | 3/1988 | Sugiyama et al. | 348/448 |
| 4,918,528 | A | * | 4/1990 | Oohashi | 348/625 |
| 5,103,199 | A | * | 4/1992 | Ootsuka | 335/133 |
| 5,103,299 | A | * | 4/1992 | Asaida | 348/264 |
| 5,237,625 | A | * | 8/1993 | Yamashita et al. | 382/266 |
| 5,404,180 | A | * | 4/1995 | Kitano et al. | 348/625 |
| 5,561,473 | A | * | 10/1996 | Saionji et al. | 348/628 |
| 5,731,845 | A | * | 3/1998 | Kashimura | 348/630 |
| 5,966,461 | A | * | 10/1999 | Harrington | 382/167 |
| 6,052,491 | A | * | 4/2000 | Clatanoff et al. | 382/275 |
| 6,091,396 | A | * | 7/2000 | Minami et al. | 345/690 |
| 6,424,383 | B1 | * | 7/2002 | Terai et al. | 348/628 |
| 6,618,097 | B1 | | 9/2003 | Yamada | |
| 6,958,760 | B1 | * | 10/2005 | Kim | 345/697 |
| 7,209,182 | B2 | * | 4/2007 | Kawabata et al. | 348/607 |
| 7,224,405 | B2 | * | 5/2007 | Taguchi et al. | 348/607 |
| 7,319,496 | B2 | * | 1/2008 | Uchida et al. | 348/625 |

FOREIGN PATENT DOCUMENTS

EP    0 454 082    4/1991

(Continued)

*Primary Examiner* — Paulos Natnael
(74) *Attorney, Agent, or Firm* — Wenderoh, Lind & Ponack, L.L.P.

(57) ABSTRACT

The image processing apparatus 100 acquires the image signal F1 and includes a steepening amount calculation unit 110, a contour shift amount calculation unit 120, an integration correction amount calculation 130 and an image generation unit 140, which generate a corrected image signal F9 in such a way that there is an intersection between waveforms, and that there are two regions with different areas bordered by the waveforms which overlap at the intersection point, the waveforms expressing changes in each value in image spaces displayed by the image signal and the corrected image signal respectively, when a waveform which expresses changes in the differential values of the image signal relative to the image spaces is symmetrical in a contour region of the image shown by the image signal.

11 Claims, 18 Drawing Sheets

FOREIGN PATENT DOCUMENTS

| | | |
|---|---|---|
| EP | 0 805 603 | 11/1997 |
| JP | 4-6960 | 1/1992 |
| JP | 10-208036 | 8/1998 |
| JP | 2000-32298 | 1/2000 |
| JP | 2001-119610 | 4/2001 |
| JP | 2003-208609 | 7/2003 |

* cited by examiner

IMAGE PROCESS APPARATUS AND METHOD FOR CONTOUR CORRECTION

TECHNICAL FIELD

The present invention relates to an image processing apparatus which performs digital signal processing on an image signal, and in particular, to an image processing apparatus which corrects image contours displayed in an image display apparatus such as a television set.

BACKGROUND ART

Contour correction technology is a technology that corrects the contours of an image and increases the image's sense of contrast. Contour correction technology is largely split into two; for contour correction technology there is shoot contour correction technology which attaches an overshoot and an undershoot before and after a contour element, and a shootless contour correction technology which steepens the change in the brightness signal in a portion of the contour.

Additionally, in shootless contour correction technology, there is a method in which one of the values for a pixel (for example, the brightness) near the pixel to be corrected is selected, and the selected value is made into the value of the aforementioned pixel to be corrected (for example, see Patent Document 1 and 2).

FIG. 1 is a functional block diagram of the image processing apparatus in the Patent Document 1 above.

An image processing apparatus 800 includes a holding unit 810, a differentiating unit 820, a coring unit 830, a comparator unit 840 and a signal selection unit 850.

The holding unit 810 acquires and holds a picture signal G1.

The differentiating unit 820 performs differentiation on the image signal G1 and outputs a primary differential signal G2 which indicates the differentiated result.

The coring unit 830 suppresses small oscillations of the primary differential signal G2 and smoothes the waveform.

The comparator 840 ranks the levels of ascent and decline in the primary differential signal G2, the waveform of which is smoothed by the coring unit 830.

The signal selection unit 850 selects, from a plurality of values included in the image signal G1 which is held in the holding unit 810, a value according to the rank outputted from the comparator 840. As a result, the signal selection unit 850 generates and outputs a corrected image signal G9.

The image processing apparatus 800 obtains the image signal G1, and utilizes the primary differential signal G2, which is generated by differentiating the image signal G1, as a contour correction control signal. Then the image processing apparatus 800 corrects the image signal G1 according to the primary differential signal G2, i.e. the contour correction control signal, and generates the corrected image signal G9.

FIG. 2 is a figure for presenting the signal generated by the image processing apparatus 800 in the Patent Document 1 above.

For example, the image signal G1 is a signal that indicates a brightness Y for every horizontal pixel position X. Here, at a horizontal pixel position X, the smaller the brightness Y, the blacker the pixel at the position, and the larger a brightness Y, the whiter the pixel at the position. Accordingly, the image signal G1 shown in FIG. 2 expresses the contours of a black image and a white image.

As shown in FIG. 2, the value of each horizontal pixel coordinate X indicated by the primary differential signal G2 increases accordingly as X heads from the horizontal pixel coordinate X on the left side towards the horizontal pixel coordinate X on the right side, and after reaching its greatest value at the center of the contour Xt, declines accordingly.

The image processing apparatus 800 selects, for every horizontal pixel coordinate X, the picture signal G1's brightness Y at a horizontal pixel coordinate X distanced by a distance according to the value that the primary differential signal G2 above indicates, and then generates a corrected image signal G9 as shown in FIG. 2.

In the corrected image signal G9 generated in this way, the gradient of brightness Y is larger than the gradient of the image signal G1, and the contour is sharpened.

FIG. 3 is a functional block diagram of an image processing apparatus in the second Patent Document above.

The image processing apparatus 900 includes a delay unit 910, a primary differentiating unit 920, an absolute value computing unit 930, a secondary differentiating unit 940 and a time axis modulating unit 950.

The delay unit 910 obtains the image signal T1, and in order to align the average delay time and the timing of the time axis modulation unit 950, delays the image signal T1.

The primary differentiating unit 920 performs differentiation on the image signal T1 delayed by the delay unit 910, and outputs the result as a primary differential signal.

The absolute value computing unit 930 takes the absolute value of the values indicated by the primary differential signal and outputs the results as an absolute value signal.

The secondary differentiating unit 940 performs differentiation on the absolute value signal and outputs the result as a secondary differential signal T2.

The time axis modulation unit 950 includes a memory and stores the image signal T1 in the memory. Then, the time axis modulation unit 950 selects a value from a plurality of values (for example the brightness) displayed by the image signal T1, according to the secondary differential signal T2 outputted from the secondary differentiating unit 940. As a result, the time axis modulation unit 950 generates and outputs the corrected image signal T9.

The image processing apparatus 900 obtains the image signal T1 and utilizes the secondary differential signal T2 as a contour correction control signal, the secondary differential signal T2 being generated by secondarily differentiating the image signal T1. Then, the image processing apparatus 900 corrects the image signal T1 according to the secondary differential signal T2, which is the contour correction control signal, and generates a corrected image signal T9.

FIG. 4 is a figure for describing the signal generated by the image processing apparatus 900 in the Patent Document 2 above.

For instance, the image signal T1 is a signal that indicates the brightness Y for every horizontal pixel coordinate X. Here, at a horizontal pixel position X, the smaller the brightness Y, the blacker the pixel at the position, and the larger the brightness Y, the whiter the pixel at that position. Therefore, the image signal T1 shown in FIG. 4 shows the contours of a black-colored image and a white-colored image.

The value indicated by the secondary differential signal T2 repeatedly increases and declines as it heads from the left side of the horizontal pixel coordinate X to the right side of the horizontal pixel coordinate X.

The image processing apparatus 900 selects, for every horizontal pixel coordinate X, a brightness Y of the picture signal T1 at the horizontal pixel coordinate X, distanced only by a distance according to the value that the secondary differential signal T2 indicates, and generates a corrected image signal T9 as shown in FIG. 4.

In the corrected image signal T9 generated in this way, the gradient of the brightness Y is larger than that of the image signal T1 and the contours are sharpened. Further, the corrected image signal T9 shows sharper contours than the corrected image signal G9, which is generated with the image processing apparatus 800 in the above Patent Document 1.

Patent Reference 1: Japanese Patent Laid-Open No. 2000-32298 bulletin (Page 5, FIG. 1)

Patent Reference 2: Japanese Patent Laid-Open No. 4-6960 bulletin (Page 7, FIG. 1)

DISCLOSURE OF INVENTION

Problems that Invention is to Solve

However, there is the problem that the image processing apparatus in the above Patent Document 1 and Patent Document 2 cannot sharpen contours at appropriate coordinates.

In other words, the corrected image signal G9, generated by the image processing apparatus 800 of the Patent Document 1 above, cannot display a contour distinctly since the steepening of the contour's ascending portion is inadequate, as shown in FIG. 2. Further, although the black-colored region indicated by the corrected image signal G9 becomes wider than the black-colored region indicated by the picture signal G1, the white-colored area indicated by the corrected image signal G9 becomes narrower than the white-colored area indicated by the picture signal G1. In other words, whereas the black-colored region in the corrected image signal G9 expands, the white-colored region shrinks and the coordinates of the contour deviate.

Also, as shown in FIG. 4, the slope of the contour is adequate in the corrected image signal T9 generated by the image processing apparatus 900 of the Patent Document 2, however, the white region which indicates the corrected image signal T9 becomes wider than the white region which the image signal T1 indicates. Therefore, in cases such as where an image of a white column is displayed, the white column will be displayed thicker in the corrected image signal T9. In other words, it is not possible to display the contours in the appropriate coordinates in the corrected image signal T9.

Therefore, the present invention has been conceived in view of the above problems, and an object of the present invention is to provide an image processing apparatus which sharpens contours at the appropriate coordinates.

Means to Solve the Problems

In order to achieve the objects above, the image processing apparatus according to the present invention is an image processing apparatus which generates a corrected image signal that shows corrected contours of an image, by correcting contours of an image represented by an image signal, the apparatus including: a signal obtainment unit which obtains the image signal; and a correction unit which generates the corrected image signal in such a way that there is an intersection with waveforms, and that there are two regions with different areas bordered by the waveforms which overlap at the intersection point, the waveforms expressing changes in each value in image spaces displayed by the image signal and the corrected image signal respectively, when a waveform which expresses changes in the differential values of the image signal relative to the image spaces is symmetrical in a contour region of the image shown by the image signal.

Thus, since the waveform of the image signal and the waveform of the corrected image signal intersect, the waveform of the corrected image signal in the present invention can be steepened more than the waveform of the corrected image signal generated by conventional primary differentiation and as a result, the contours can be sharpened. Further, since the areas of the regions bordered by the two waveforms in the contour region mutually differ, it is possible to reduce the size of the white region indicated by the corrected image signal in the present invention to less than the size of the white region indicated by the corrected image signal generated with conventional secondary differentiation and can approach the size of the white region indicated by the image signal. As a result, the contours at the appropriate coordinates can be sharpened. Therefore, display items such as the white column and white letters shown by the image signal do not excessively widen or thin and can be displayed in high-contrast.

Also, the correction unit includes: a shift amount calculation unit which calculates a shift amount for shifting the waveform in the contour region of the image signal; a steepening amount calculation unit which calculates a steepening amount for steepening the waveform in the contour region of the image signal; an integration unit which calculates a correction amount for correcting the image signal of the contour region by integrating the shift amount and the steepening amount calculated by the shift amount calculation unit and the steepening amount calculation unit; and a generation unit which generates the corrected image signal by correcting the image signal in the contour region by the correction amount calculated by the integration unit.

Thus, since the shift amount is included in the correction amount, the waveform of the image signal can be shifted according to the shift amount, and thus the areas of the regions bordered by the two waveforms above can be differentiated with more confidence. Further, since the steepening amount is included in the correction amount, the waveform of the image signal can be steepened according to the steepening amount and the contours can be sharpened with more confidence.

Further, the image processing apparatus may be characterized in that the shift amount calculation unit adjusts a gain of the calculated shift amount, further, the steepening calculation unit adjusts a gain of the calculated steepening amount, and the integration unit calculates the correction amount by integrating the gain-adjusted shift amount and steepening amount.

Thus, the size of the white area indicated by the corrected image signal can be freely adjusted. In other words, the coordinates of the contour can be freely adjusted and the degree of freedom for the contour correction to the image can be increased.

Also, the integration unit may calculate the correction amount by weighting the shift amount and the steepening amount, and adding together the weighted shift amount and steepening amount. Or, the generation unit may generate the corrected image signal by weighting each value shown by the image signal and correcting the weighted image signal.

Thus, the smoothness of the corrected image signal can be adjusted and a smooth and steep corrected image signal can be generated.

Also, the shift amount calculation unit may perform at least one of a primary differentiation and a secondary differentiation against each value in the image space shown by the image signal, and calculate the shift amount based on the result of the calculation.

Thus, the waveform of the image signal can be shifted appropriately.

Also, the steepening amount calculation unit may perform at least one of a primary differentiation and a secondary differentiation calculation against each value in the image space shown by the image signal, and to calculate the steepening amount based on the result of the calculation.

Thus, the waveform of the image signal can be steepened appropriately.

Also, the image processing apparatus may be characterized in that the shift amount calculation unit calculates the shift amount per position in the image space, the steepening amount calculation unit calculates the steepening amount per position in the image space, and the integration unit calculates the correction amount for each position in the image space by adding up a shift amount for each position and a steepening amount for a separate position distanced by the shift amount for each position.

Thus, a correction amount can be calculated appropriately by shifting the waveform of the image signal such that the shifted waveform is steepened.

Also, the image processing apparatus may be characterized in that the image signal expresses a value related to the image per position in the image space, the corrected image signal expresses a corrected value related to the image per position in the image space, and the generation unit generates the corrected picture signal for each position in the image space in such a way that a value in the image signal at a separate position distanced by the correction amount for a position becomes the corrected value at the position.

Thus, an image signal can be corrected appropriately according to the correction amount calculated by the integrated unit.

Also, the image processing apparatus may be characterized in further including: a transformation unit which transforms the image signal obtained by the signal obtainment unit such that a whole number multiple of a pixel accuracy for the image represented by the image signal is obtained; and a display control unit which makes the corrected image signal generated by the correction unit display in a display unit which groups an whole number multiple of light-emission elements as a single pixel, based on the transformed image signal.

Thus, the image shown by the image signal can be caused to display in high contrast with high image quality.

Note that the present invention can not only be realized as an image processing apparatus such as the one above, but also as a method, a program or a recording device on which the program is stored.

Effects of the Invention

The image processing apparatus in the present invention performs the functional effect of sharpening contours at an appropriate position.

Figure 1:
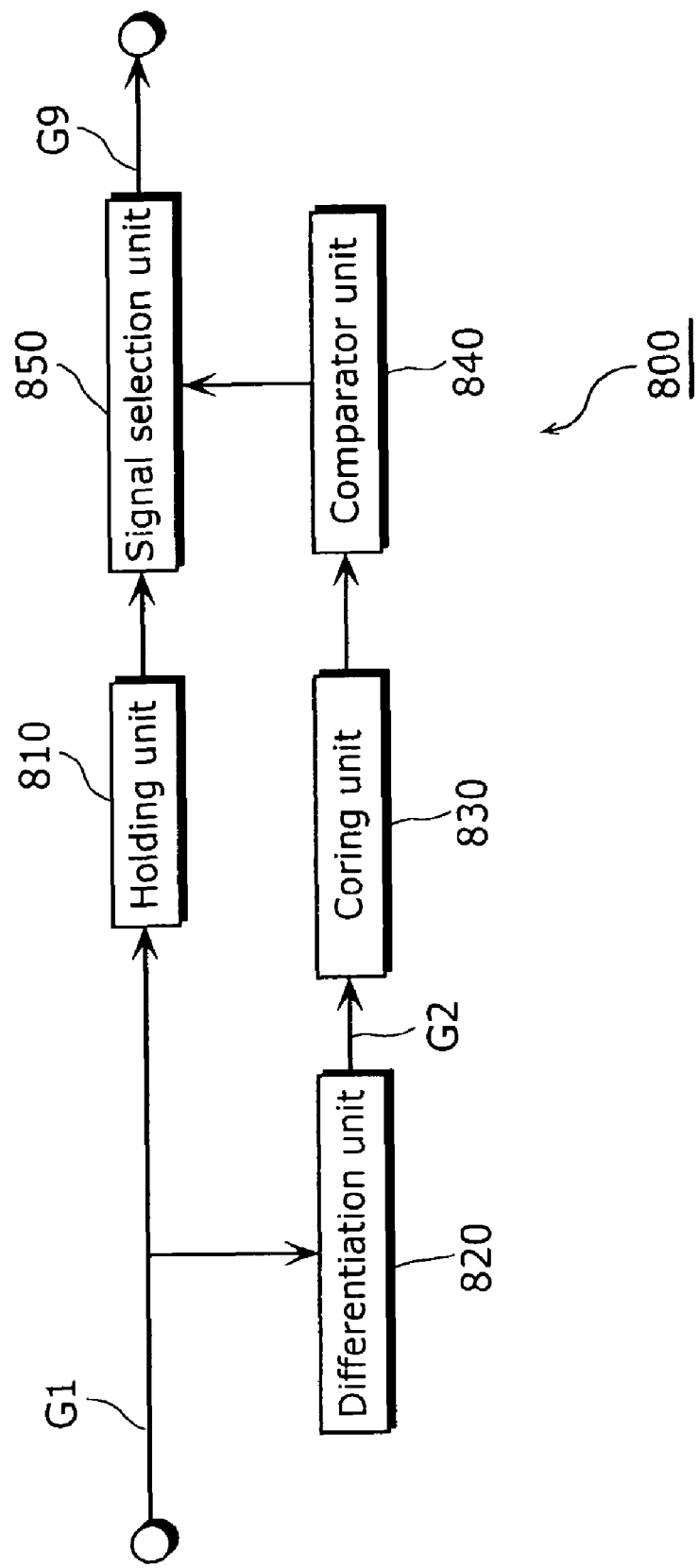
FIG. 1 is a functional block diagram of the image processing apparatus in the Patent Document 1 above.
Figure 2:
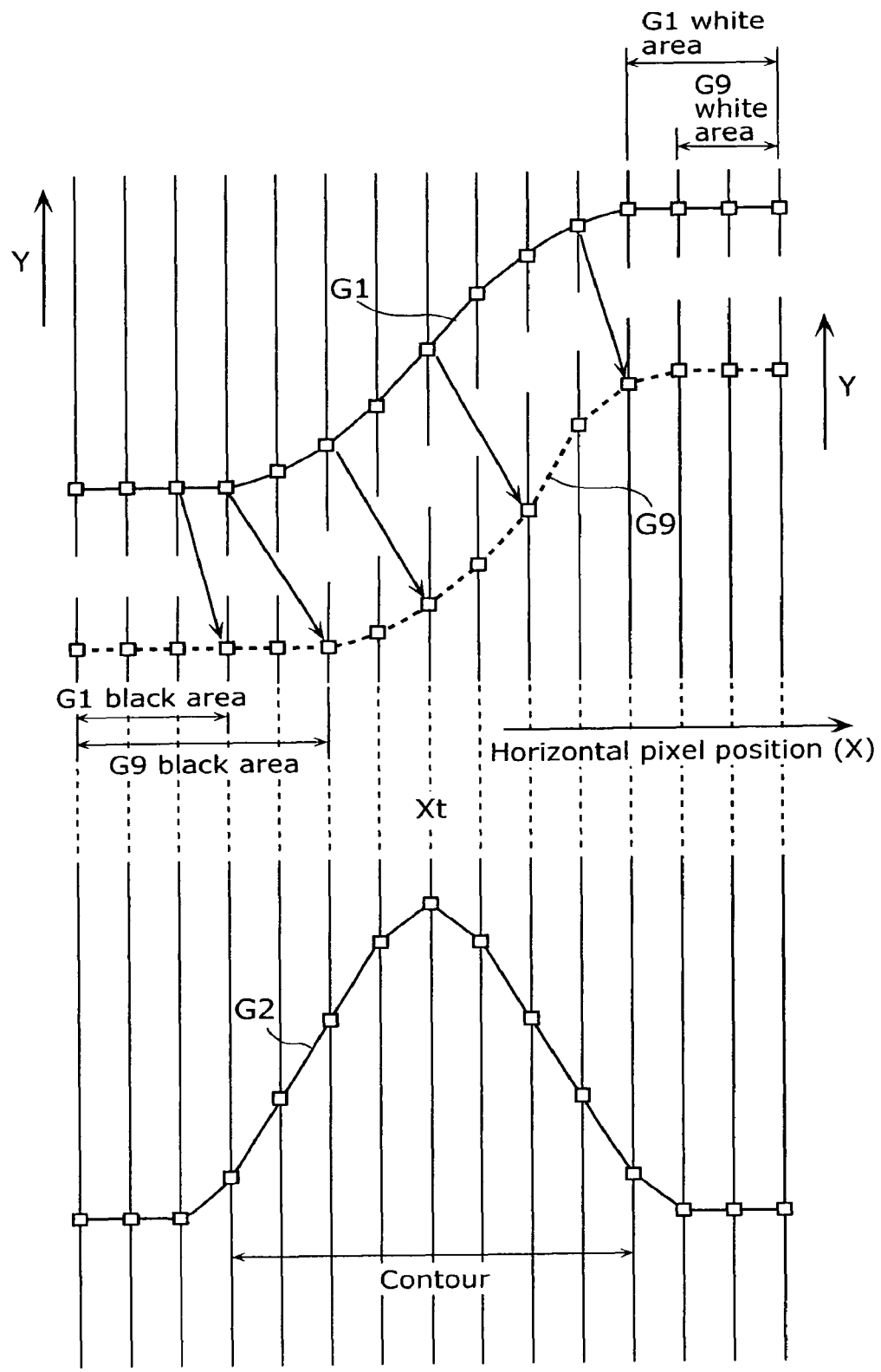
FIG. 2 is a figure for presenting the signal generated by the image processing apparatus in the Patent Document 1 above.
Figure 3:
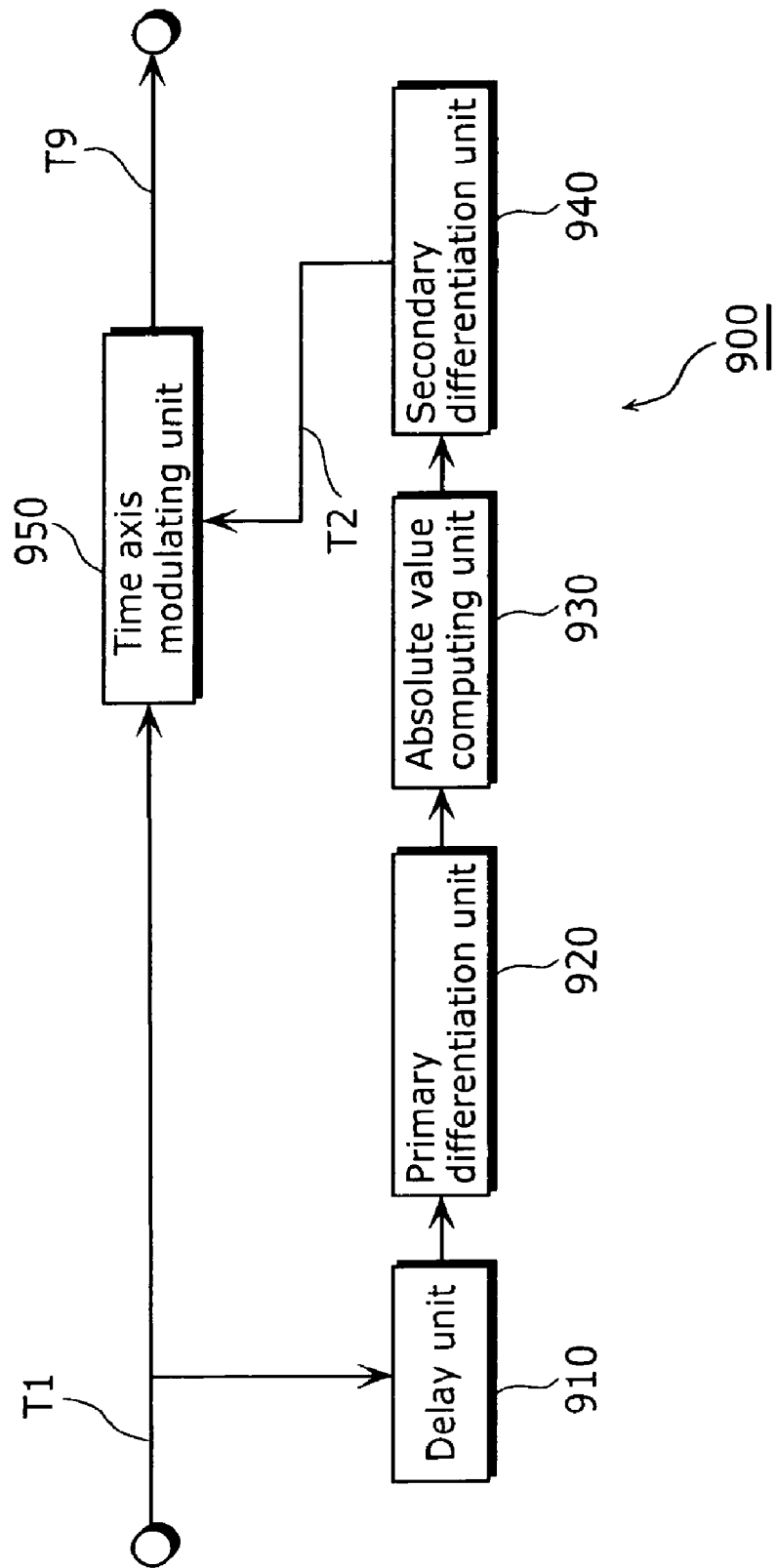
FIG. 3 is a functional block diagram of an image processing apparatus in the second Patent Document above.
Figure 4:
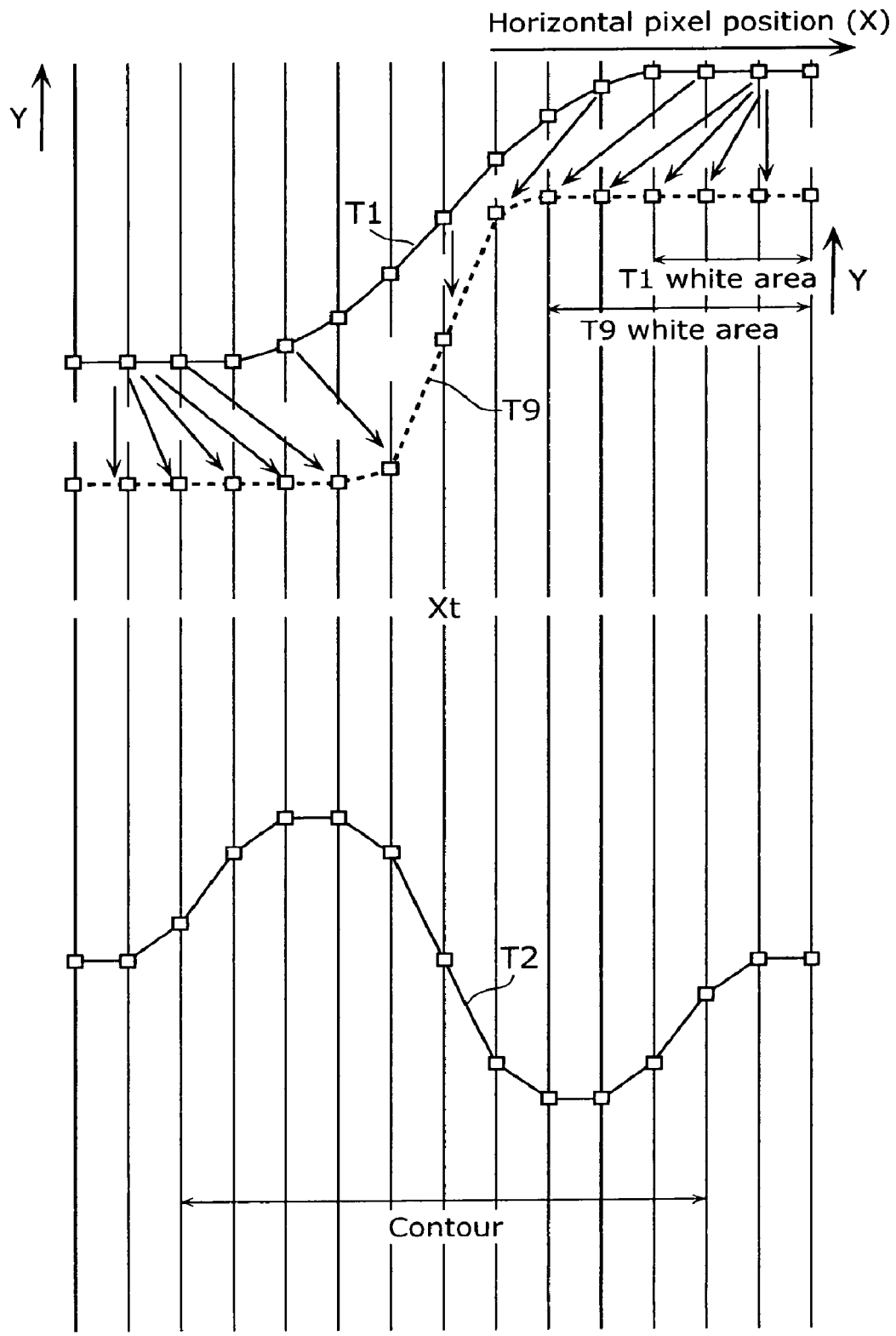
FIG. 4 is a figure for describing the signal generated by the image processing apparatus in the Patent Document 2 above.

NUMERICAL REFERENCES 100, 100a Image processing apparatus
110 Steepening amount calculation unit
111 Band control unit
112 Primary differentiating unit
113 Secondary differentiating unit
114 Sign extraction unit
115 Sign inversion unit
116 Control amount adjustment unit
120 Contour shift amount calculation unit
121 Band control unit
122 First differentiating unit
123 Control amount adjustment unit
130 Integrated correction amount calculation unit
131 Delay unit
132 Correction amount computation unit
133 Adding machine
140 Image generation unit
141 Delay unit
142 Selection unit

BEST MODE FOR CARRYING OUT THE INVENTION

Below, an image processing apparatus in the present embodiments is explained with reference to figures.

Figure 5:
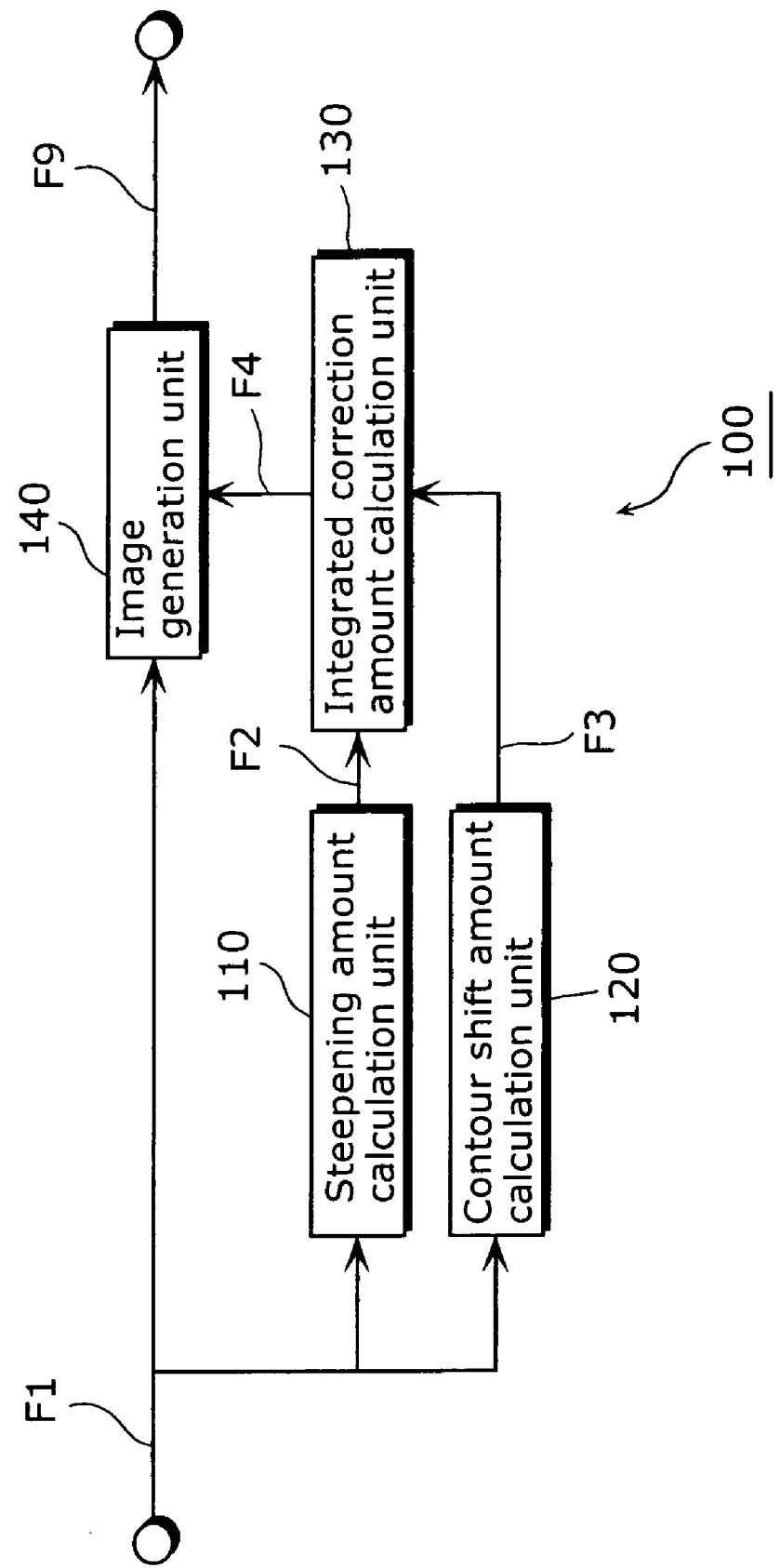
FIG. 5 is a functional block diagram of the image processing apparatus in the embodiment of the present invention.

FIG. 5 is a functional block diagram of the image processing apparatus in the embodiment of the present invention.

The image processing apparatus 100 in the present embodiment is an apparatus which sharpens the contours of an image represented by an image signal F1 at appropriate coordinates and includes a steepening amount calculation unit 110, a contour shift amount calculation unit 120, an integrated correction amount calculation unit 130 and an image generation unit 140.

The contour shift amount calculation unit 120 acquires the image signal F1, and generates and outputs a shift signal F3 by performing differentiation on the image signal F1.

The steepening amount calculation unit 110 generates and outputs a steepness signal F2 by obtaining and processing the image signal F1.

The integrated correction amount calculation unit 130 generates and outputs a contour correction control signal F4 by integrating the shift signal F3, which is outputted from the contour shift amount calculation unit 120, and the steepness signal F2, which is outputted from the steepening amount calculation unit 110.

The image generation unit 140 acquires the image signal F1 and the contour correction control signal F4, which is outputted from the integrated correction amount calculation unit 130. Then, the image generation unit 140 generates and outputs a corrected image signal F9 by correcting the image signal F1 according to the contour correction control signal F4.

Note that in the present embodiment, the contour shift amount calculation unit 120, the steepening amount calculation unit 110 and the image generation unit 140 are configured as a means for signal acquisition which acquires the image signal F1; the contour shift amount calculation unit 120, the steepening amount calculation unit 110, the integrated correction amount calculation unit 130 and the image generation unit 140 are configured as a means for correction. In other words, the correction unit configured generates, the corrected image signal F9 in such a way that there is an intersection between waveforms, and that there are two regions with different areas bordered by the waveforms which overlap at the intersection point, the waveforms expressing changes in each value in the image spaces displayed by the image signal F1 and the corrected image signal F9 respectively, when the waveform which expresses changes in differential values of the image signal relative to the image spaces is symmetrical in a contour region of the image shown by the image signal F1.

Also, when the horizontal axis is assumed to be image space, i.e. every pixel position in a pixel sequence, and the vertical axis is assumed to be the value (strength) of each pixel coordinate, the waveform of the signals in the present embodiment is the signal configuration expressed by the horizontal axis and the vertical axis. Also, when the signals show the value for every pixel coordinate for every time period in the sequential order of the pixels, the waveform of the signal above is the same as the waveform of the signal expressed with the horizontal axis as time and the vertical axis as the value at that time.

Figure 6:
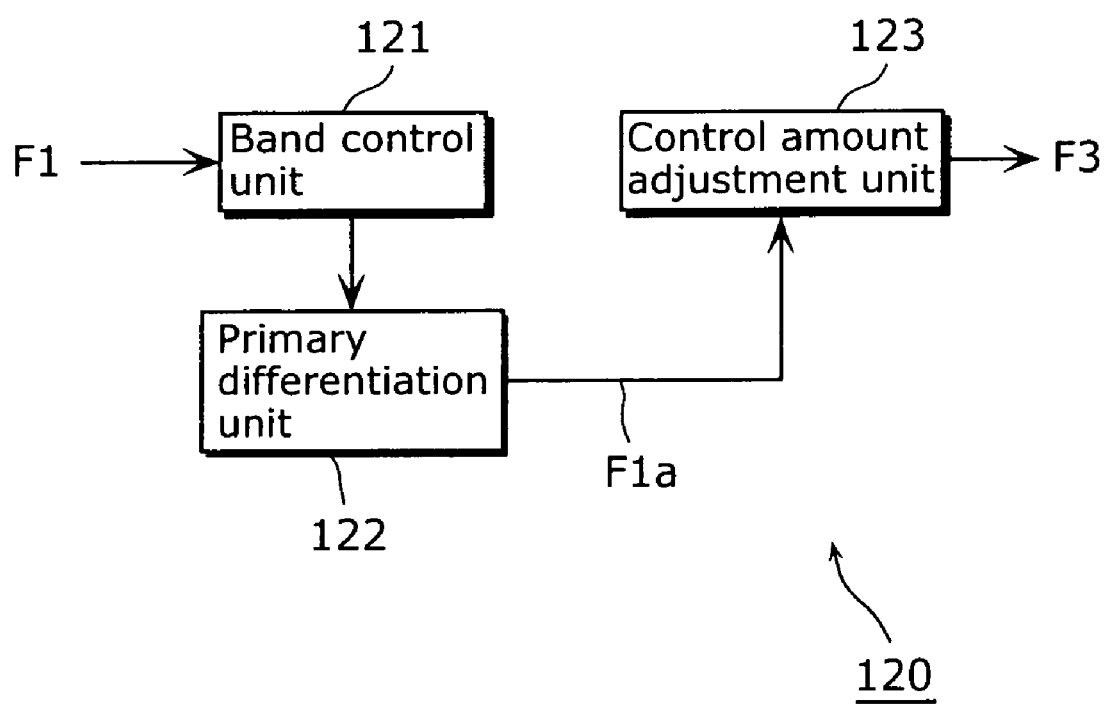
FIG. 6 is a functional block diagram of the contour shift amount calculation unit.

FIG. 6 is a functional block diagram of the contour shift amount calculation unit 120.

The contour shift amount calculation unit 120 includes a band control unit 121, a primary differentiating unit 122 and a control amount adjustment unit 123.

The band control unit 121 is configured for example as a low pass filter, and suppresses the high frequency elements included in the image signal F1, and outputs the image signal F1, in which the high frequency elements have been suppressed, to the primary differentiating unit 122.

The primary differentiating unit 122 differentiates against the image signal F1 outputted from the band control unit 121, in other words, calculating the difference in the image signal F1. The primary differentiating unit 122 outputs the differentiated result as a primary differential signal F1$a$.

The control amount adjustment unit 123 adjusts the gain of the primary differential signal F1$a$ and outputs the adjustment result as a shift signal F3.

Note that the shift signal F3 is a signal which indicates the shift amount for shifting a waveform in the contour region of the image signal F1 for every position in the image space. In other words, the contour shift amount calculation unit 120 calculates a shift amount for every position of the image space.

Figure 7:
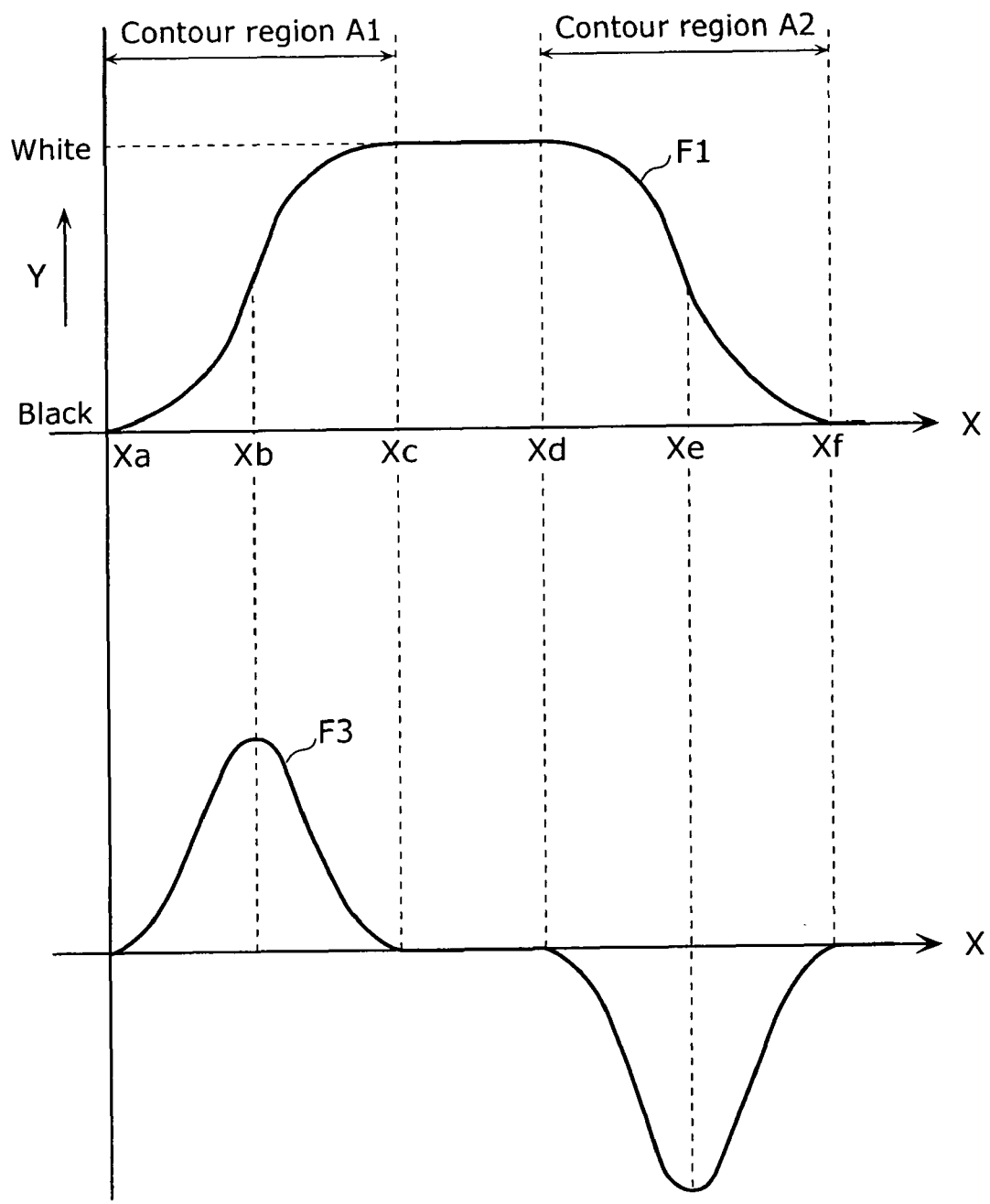
FIG. 7 is a figure which shows the image signal and the shift signal.

FIG. 7 is a figure which shows the image signal F1 and the shift signal F3.

The image signal F1 shows for example the brightness Y for every horizontal pixel position X. The brightness Y for every horizontal pixel position X is added gradually as the horizontal pixel position moves from the horizontal pixel position Xa toward the horizontal pixel position Xc, is constant between the horizontal pixel position Xc and the horizontal pixel position Xd, and declines gradually as the horizontal pixel position moves from the horizontal pixel position Xd towards the horizontal pixel position Xf.

Accordingly, the region from the horizontal pixel position Xa to the horizontal pixel position Xc and the region from the horizontal pixel position Xd to the horizontal pixel position Xf, indicate the black and white contour region A1 and A2 respectively, which are included in the image which the picture signal F1 expresses.

When the contour shift amount calculation unit 120 acquires something like the above image signal F1, the contour shift amount calculation unit 120 generates for example a shift signal F3 with a maximum value at the contour center Xb in the contour region A1, and with a minimum value in the contour center Xe, in the contour region A2. Note that the contour center is a horizontal pixel position which indicates the median value between the maximum value and minimum value of the brightness Y in the contour region.

Also, the waveform of the shift signal F3 takes a form that is bi-laterally symmetrical and bordered by the contour center Xb in the contour region A1, and takes a form that is bi-laterally symmetrical and bordered by the contour center Xe in the contour region A2.

Figure 8:
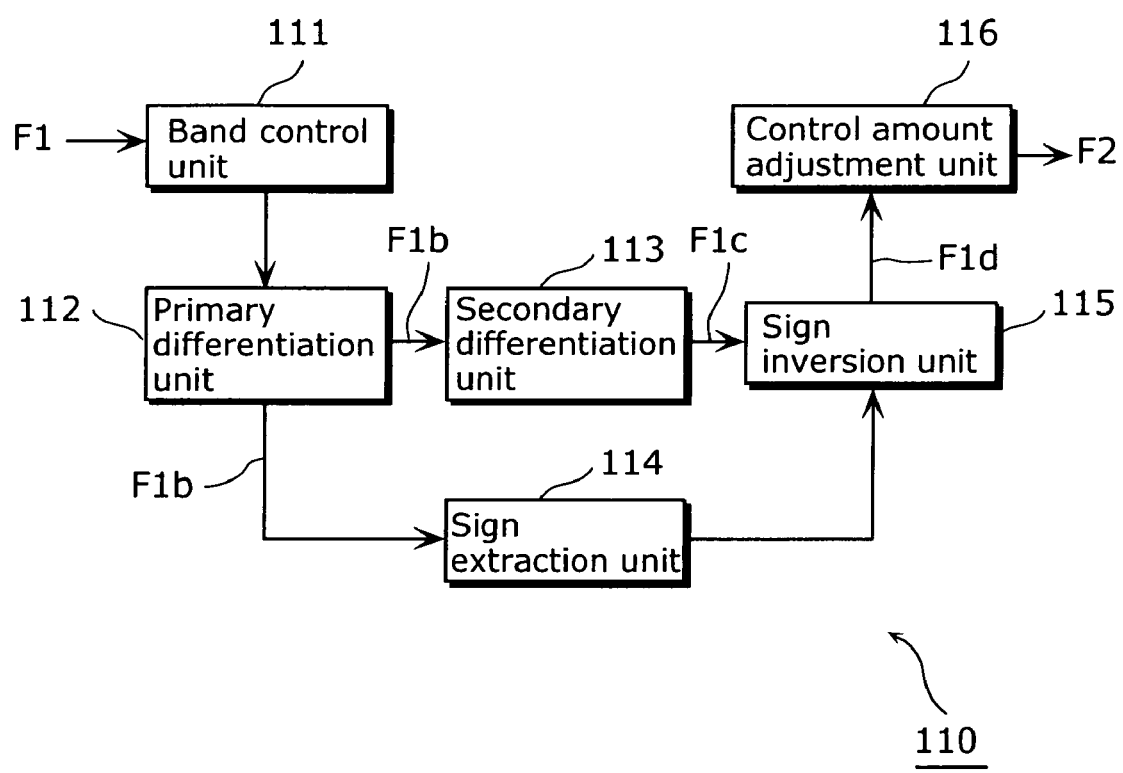
FIG. 8 is a functional block diagram of the steepening amount calculation unit.

FIG. 8 is a functional block diagram of the steepening amount calculation unit 110.

The steepening amount calculation unit 110 includes a band control unit 111, a primary differentiating unit 112, a secondary differentiating unit 113, a sign extraction unit 114, a sign inversion unit 115 and a control amount adjustment unit 116.

The band control unit 111 is configured as, for example, a low pass filter, like the band control unit 121 of the contour shift amount calculation unit 120, suppresses the high frequency elements included in the image signal F1 and outputs the image signal F1, with its high frequency elements suppressed, to the primary differentiating unit 112.

The primary differentiating unit 112 differentiates against the image signal F1 outputted from the band control unit 111, in the same way as the primary differentiating unit 122 of the contour shift amount calculation unit 120, in other words, the primary differentiating unit 122 makes a difference calculation against the image signal F1. The primary differentiating unit 122 outputs the differentiated result as a primary differential signal F1$b$.

The secondary differentiating unit 113 performs differentiation against the primary differential signal F1$b$ which is outputted from the primary differentiating unit 112, and outputs the differentiated result as a secondary differential signal F1$c$.

The sign extraction unit 114 acquires the primary differential signal F1$b$ which is outputted from the primary differentiating unit 112 and extracts a sign indicated by the primary differential signal F1$b$.

The sign inversion unit 115 acquires the secondary differential signal F1$c$ and by inverting the sign indicated by the secondary differential signal F1$c$ based on the sign extracted from the encoding sign extraction unit 114, the sign inversion signal F1d is generated and outputted.

The control amount adjustment unit 116 adjusts the gain of the sign inversion signal F1d outputted from the sign inversion unit 115 and outputs the adjustment result as a steepness signal F2.

Note that the steepness signal F2 is a signal that indicates the steepening amount in order to steepen the waveform in the contour region of the image signal F1 for every position in the image space. In other words, the steepening amount calculation unit 110 calculates the steepening amount for every position of the image space.

Figure 9:
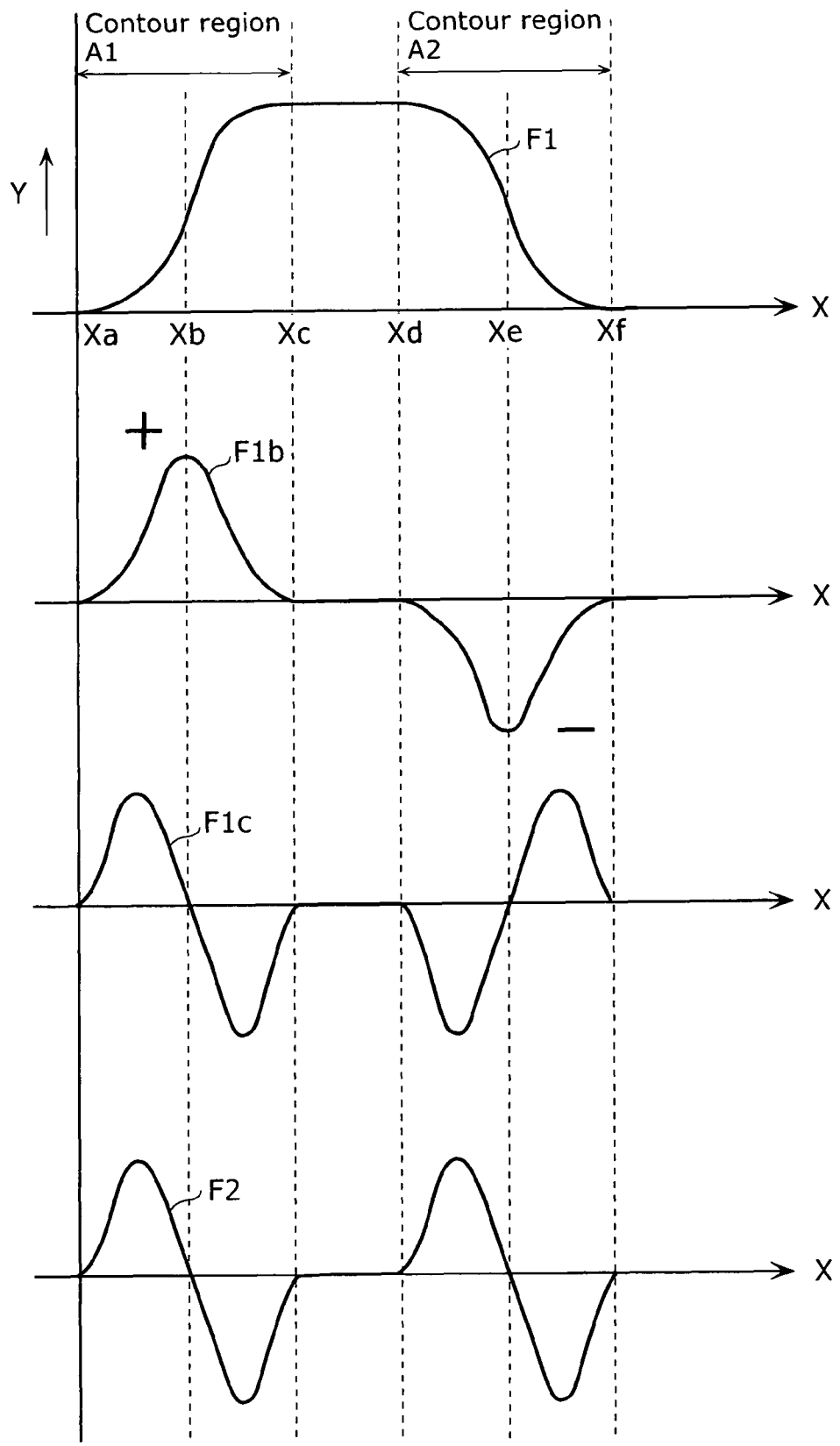
FIG. 9 is a figure which shows the image signal, the primary differential signal, the secondary differential signal and the steepness signal.

FIG. 9 is a figure which shows the image signal F1, the primary differential signal F1b, the secondary differential signal F1c and the steepness signal F2.

The primary differential signal F1b expresses a waveform identical to the shift signal F3 shown in FIG. 7. In other words, the primary differential signal F1b expresses a bilaterally symmetrical waveform where the contour center Xb reaches its maximum value in the contour region A1, and expresses a bilaterally symmetrical waveform as the contour center Xe reaches the maximum value in the contour region A2.

The sign extraction unit 114 extracts a plus sign in the region from the horizontal pixel position Xa through Xc, based on the primary differential signal F1b, and extracts a minus sign in the region from the horizontal pixel position Xd through Xf.

The secondary differential signal F1c expresses a convex waveform in a plus direction in the region from the horizontal pixel position Xa through Xb, expresses a convex waveform in a minus direction in the region from the horizontal pixel position Xb through Xc, along with expressing a convex waveform in a minus direction in the region from the horizontal pixel position Xd through Xe, and expressing a convex waveform in a plus direction in the region from the horizontal pixel position Xe through Xf.

The sign inversion unit 115 applies the sign extracted by the sign extraction unit 114 to the secondary differential signal F1c. In other words, the sign inversion unit 115 inverts only the waveform in the region from the horizontal pixel position Xd through Xf of the secondary differential signal F1c. The control amount adjustment unit 116 adjusts the gain of the secondary differential signal F1c, inverted as above, and generates the steepness signal F2 as shown in FIG. 9.

Figure 10:
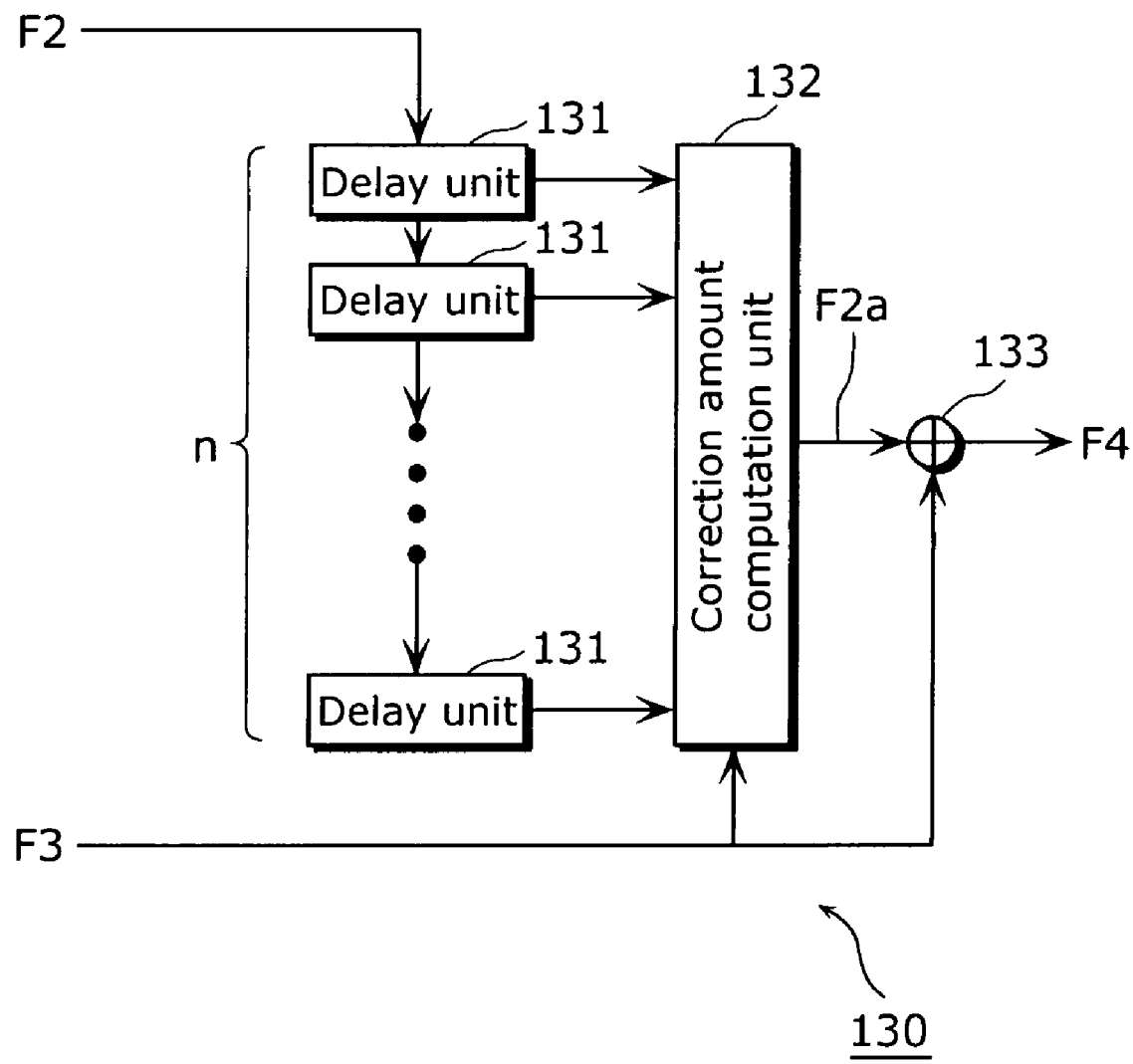
FIG. 10 is a functional block diagram of the integrated correction amount calculation unit.

FIG. 10 is a functional block diagram of the integrated correction amount calculation unit 130.

The integrated correction amount calculation unit 130 includes a plurality (for instance, n units) of delay units 131, a correction amount calculation unit 132 and an adding machine 133.

The delay unit 131 is configured as a memory, and the value at a horizontal pixel position X in the steepness signal F2 is stored in the delay unit 131. For example, for the steepness signal F2, the value of the horizontal pixel position X1 is f21 and just as the value of the horizontal pixel position X2 is f22, the steepness signal F2 expresses the respective values f21 through f2n of the horizontal pixel position X1 through Xn. Then, when the integrated correction amount calculation unit 130 acquires the steepness signal F2, the respective values f21 through f2n of the horizontal pixel position X1 through Xn expressed by the steepness signal F2 are stored individually in each delay unit 131, in order from the f21 value at the horizontal pixel position X1.

When the correction amount calculation unit 132 acquires the shift signal F3, the correction amount calculation unit 132 selects a delay unit 131, according to the value that the shift signal F3 expresses for every horizontal pixel position X, reads out the value being stored in the delay unit 131, and outputs the value read out per horizontal pixel position X, as the corrected steepness signal F2a, to the adding machine 133.

The adding machine 133 adds the value expressed per horizontal pixel position X by the shift signal F3 to the corrected steepness signal F2a and outputs the value added per horizontal pixel position X as the contour correction control signal F4.

Note that in the present embodiment, the integrated correction amount calculation unit 130 is configured as an integration means that calculates the correction amount used for correcting the image signal F1 of the contour region, by integrating the shift amount calculated by the contour shift amount calculation unit 120 and the steepening amount calculated by the steepening amount calculation unit 110. In other words, the contour correction control signal F4 indicates the correction amount per position in the image space.

Figure 11:
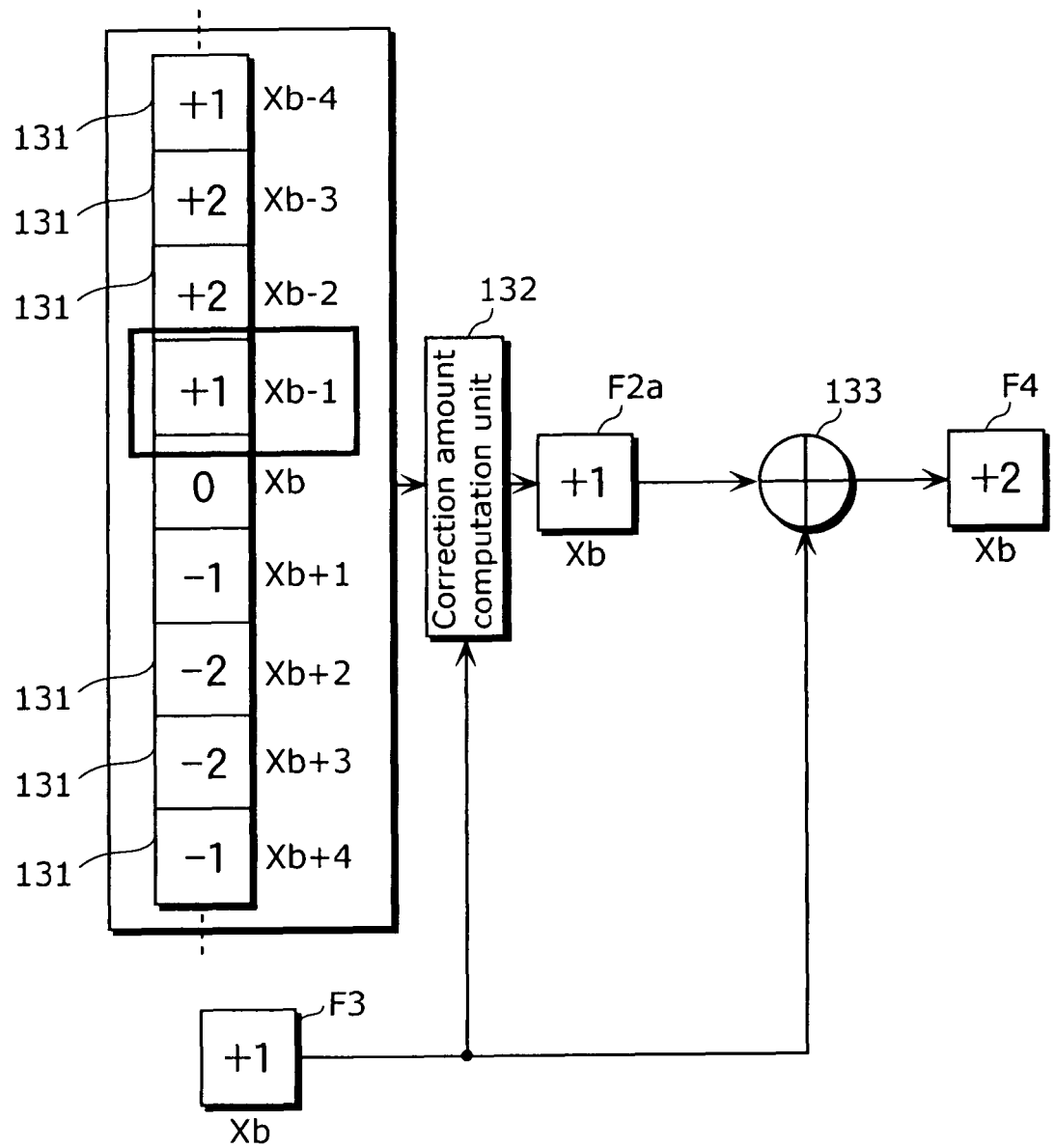
FIG. 11 is an explanatory figure for explaining the operation of the integrated correction amount calculation unit.

FIG. 11 is an explanatory figure for explaining the operations of the integrated correction amount calculation unit 130.

For example, the steepness signal F2 indicates −1, −2, −2, 0, +1, +2, +2, +1 as the values of the horizontal pixel positions (Xb+4) through (Xb−4) in their respective order. In this case, the value of each horizontal pixel position expressed by the steepness signal F2 is stored in respective delay units 131.

When the correction amount calculation unit 132 acquires the shift signal F3, which indicates a value of "+1" for the horizontal pixel position Xb, the correction amount calculation unit 132 reads out the value "+1" from the delay unit 131 which stores the value of the horizontal pixel position (Xb−1), distanced from the horizontal pixel position Xb by the value "+1" as expressed by the shift signal F3. Then, the correction amount calculation unit 132 outputs the corrected steepness signal F2a which indicates the value "+1" as the value of the horizontal pixel position Xb.

The adding machine 133 adds the value "+1" of the horizontal pixel position Xb indicated by the shift signal F3, and the value "+1" of the horizontal pixel position Xb, indicated by the corrected steepness signal F2a, and outputs the contour correction control signal F4, which indicates the value "+2" as the horizontal pixel position Xb.

In this way, the integrated correction amount calculation unit 130 in the present embodiment calculates the correction amount at a position by adding the shift amount for the position in the image space to the steepening amount for a position distanced from the position by the shift amount for the position.

Figure 12:
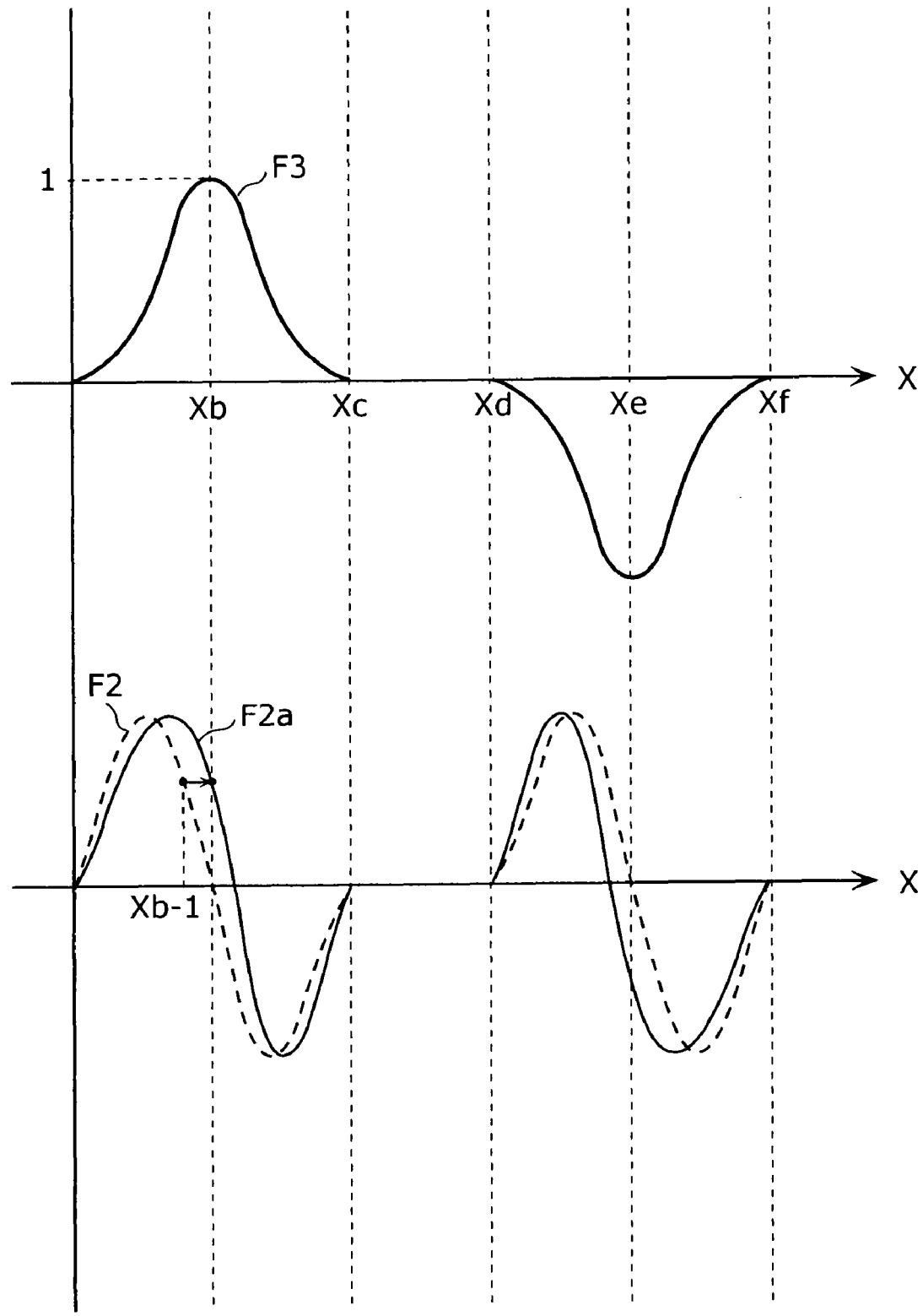
FIG. 12 is a figure which shows the shift signal, the steepness signal and the corrected steepness signal.

FIG. 12 is a figure which shows the shift signal F3, the steepness signal F2 and the corrected steepness signal F2a.

The corrected steepness signal F2a shows the values, per horizontal pixel position X, of the steepness signal F2 at the horizontal pixel position X distanced by the value of the shift signal F3 at the horizontal pixel position X. For example, when the value of the shift signal F3 is "1" at the horizontal pixel position Xb, the value of the corrected steepness signal F2a at the horizontal pixel position Xb indicates the value of the steepness signal F2 at the horizontal pixel position (Xb−1). In other words, the corrected steepness signal F2a is expressed in a waveform shifted by a range and a direction according to the shift signal F3.

Figure 13:
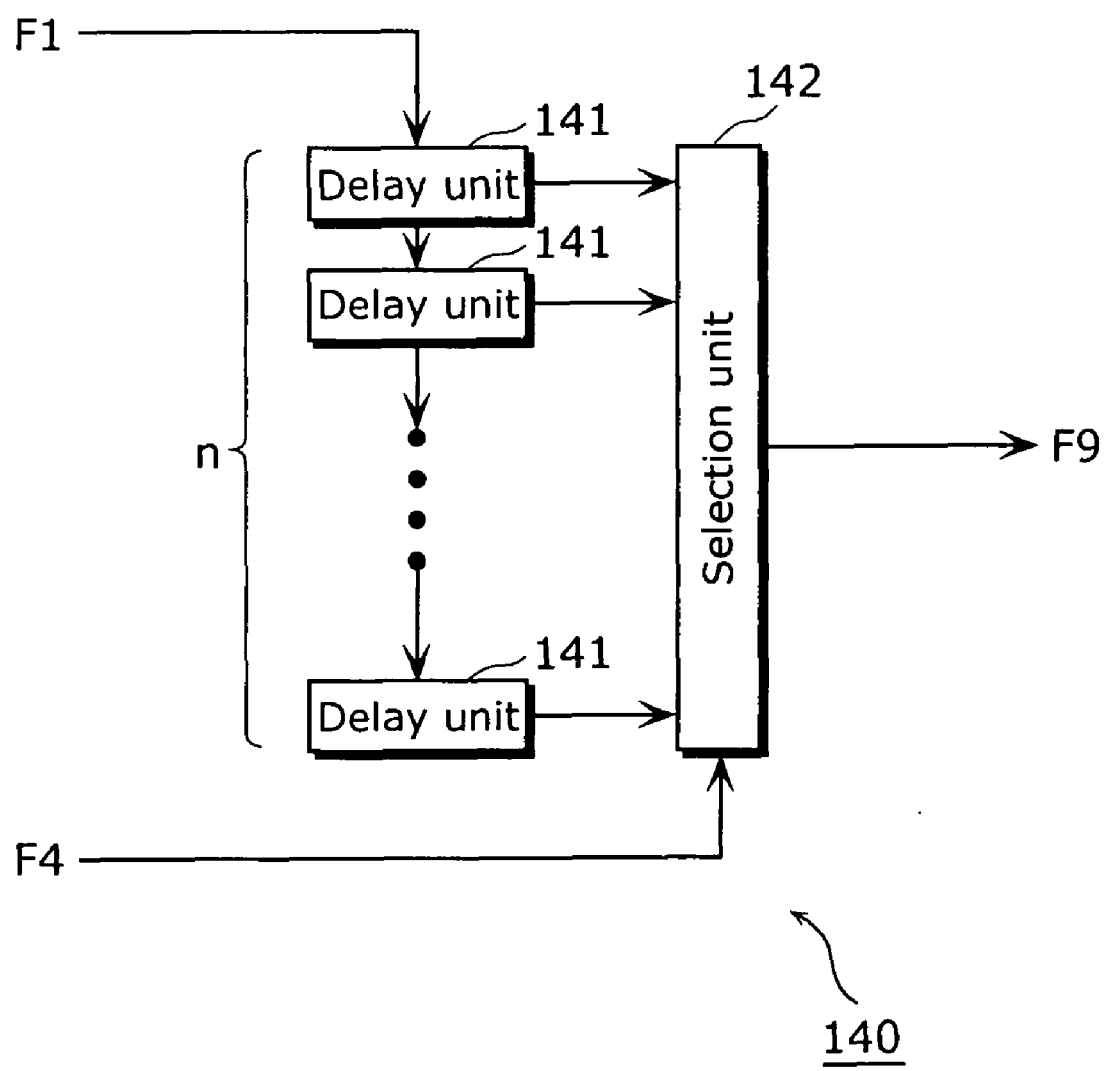
FIG. 13 is a functional block diagram of the image generation unit.

FIG. 13 is a functional block diagram of the image generation unit 140.

The image generation unit 140 includes a plurality of delay units 141 (for example n units) and a selection unit 142.

The delay unit 141 is configured as a memory in the same way as the delay unit 131 in the integrated correction amount calculation unit 130, and the value at the horizontal pixel position X in the image signal F1 is stored in the delay unit 141. For example, just as the value of the horizontal pixel position X1 is f11 and the value of the horizontal pixel position X2 is f12 in the image signal F1, the image signal F1 expresses each value f11 through f1n at the horizontal pixel positions X1 through Xn. Then, when the image generation unit 140 acquires the image signal F1, the respective values f11 through f1n of the horizontal pixel position X1 through Xn, indicated by the image signal F1, are individually and respectively stored in each delay unit 141, in an order starting from the f11 value of the horizontal pixel position X1.

The selection unit 142 performs the same operation as the correction amount calculation unit 132 of the integrated correction amount calculation unit 130. When the selection unit 142 acquires the contour correction control signal F4, the selection unit 142 selects a delay unit 141 that corresponds to the value which the contour correction control signal F4 indicates for every horizontal pixel position X, reads out the value being stored in the delay unit 141, and outputs the value read out, per horizontal pixel position X, as the corrected image signal F9.

Note that in the present embodiment, the image generation unit 140 is configured as a generation means for generating the corrected image signal F9 by correcting the image signal F1 of the contour region, by only the shift amount calculated by the integrated correction amount calculation unit 130. The image generation unit 140 then generates the corrected image signal F9 for each position in the image space, such that the values of the image signal F1 at positions distanced by the correction amount from each position in the image space become the correction value for each position.

Taking the value at the horizontal pixel position X of the corrected image signal F9 to be F9(X), F9(X) is expressed by the (Equation 1) and (Equation 2) below.

$$F9(X)=F1(X-L) \quad \text{(Formula 1)}$$

$$L=F3(X)+F2(X-F3(X)) \quad \text{(Formula 2)}$$

Here, F1(X−L) expresses the value at the horizontal position (X−L) of the image signal F1. Likewise, F3(X) expresses the value of the shift signal F3 at the horizontal pixel position X and, F2(X−F3(X)) expresses the value of the steepness signal F2 at the horizontal pixel position (X−F3(X)).

In the present embodiment, the contour shift amount calculation unit 120 calculates F3(X) as the value of the shift signal F3, then the correction amount calculation unit 132 in the steepening amount calculation unit 110 and the integrated correction amount calculation unit 130 calculate F2(X−F3(X)) as a value of the corrected steepness signal F2a. The adding machine 133 of the integrated correction amount calculation unit 130 then calculates the distance from the horizontal pixel position X L=(F3(X)+F2(X−F3(X))). The image generation unit 140 selects, from each of the horizontal pixel position values of the image signal F1, a value F1(X−L) at a horizontal pixel position (X−L) which is distanced by a distance L from the horizontal pixel position X and the value F1(X−L) is a value F9(X) of the corrected image signal F9 at the horizontal pixel position X.

Figure 14:
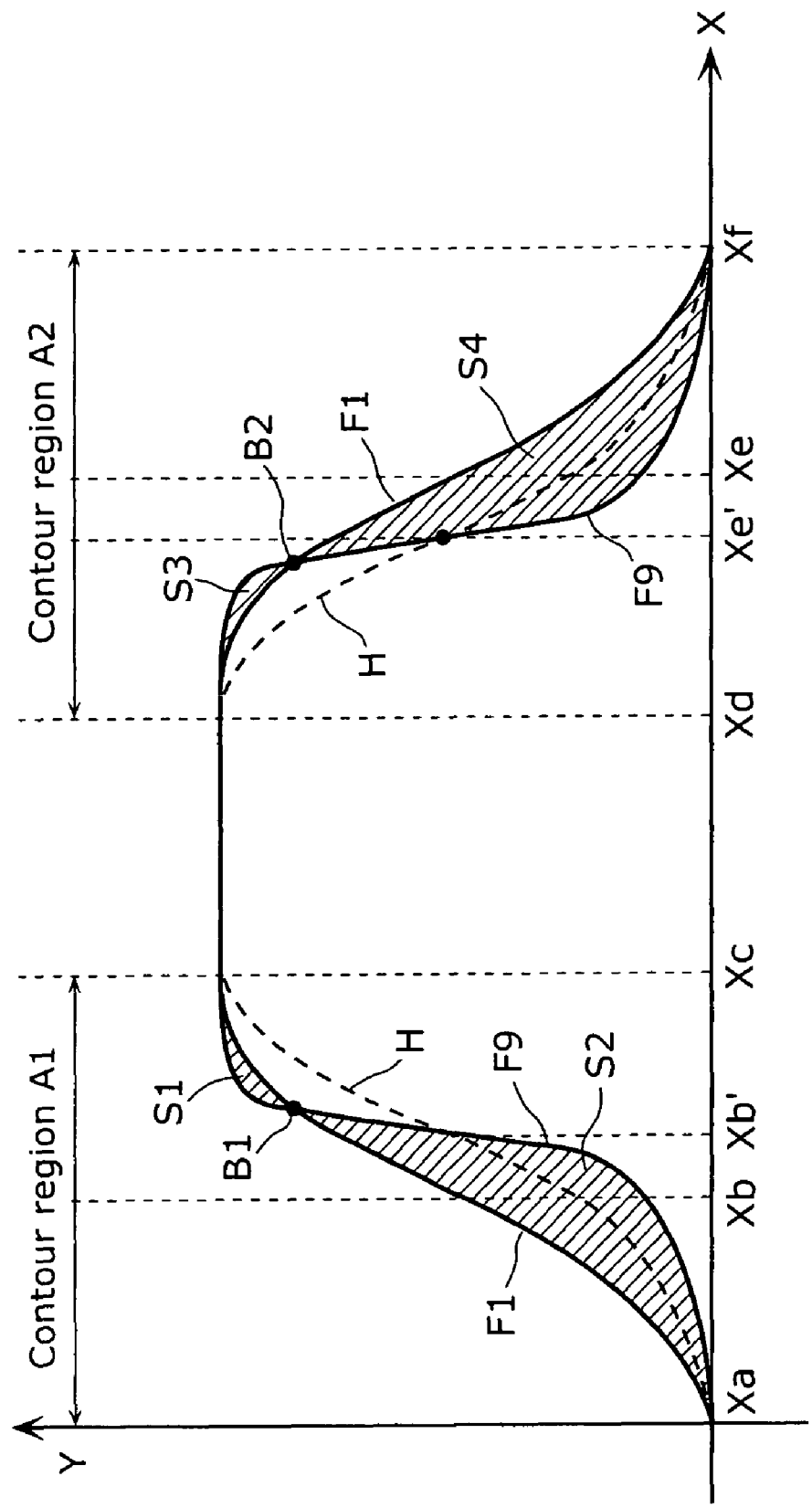
FIG. 14 is a figure which shows the image signal and the corrected image signal.

FIG. 14 is a figure which shows the image signal F1 and the corrected image signal F9.

In the contour region A1 and A2, there are intersection points B1 and B2 for the respective waveforms of the image signal F1 and the corrected image signal F9. The areas S1 and S2 of the two regions, which overlap the intersection point B1, and the areas S3 and S4 of the two regions which overlap the intersection point B are bordered by the respective waveforms of the image signal F1 and the corrected image signal F9, and the areas are different from each other.

Here, the waveform of the signal H has the shape of a waveform in the contour region A1 of the image signal F1, shifted to the right according to the value indicated by the shift signal F3, and also possesses the shape of a waveform in the contour region A2 of the image signal F1, shifted to the left according to the value indicated by the shift signal F3.

Accordingly, when the waveform of the corrected image signal F9 fixes the value at the contour center Xb of the signal H, the waveform of the corrected image signal F9 takes a shape similar to a steepened waveform of the signal H in the contour region A1, and, while fixing the waveform at the contour center Xe of the signal H, takes a shape similar to a steepened signal H in the contour region A2.

Figure 15:
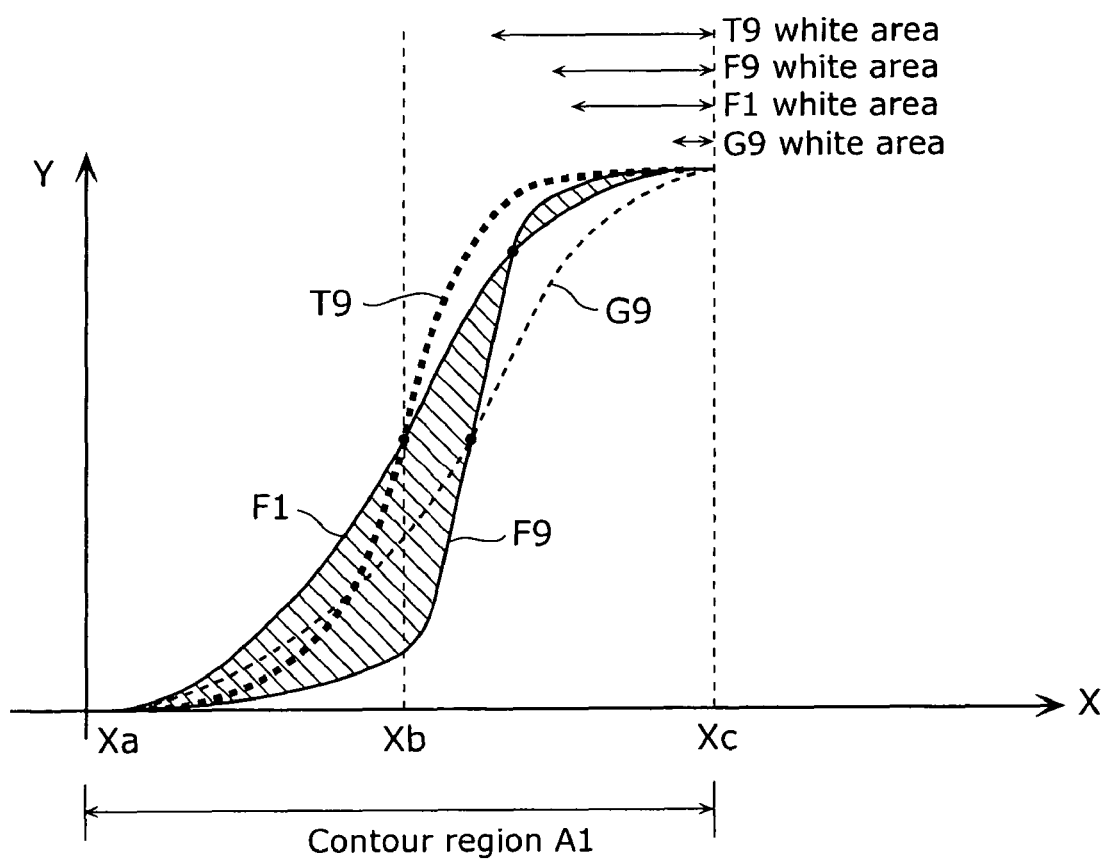
FIG. 15 is a figure that compares the corrected picture signals generated by the conventional image processing apparatus, and shows the corrected image signal in the present embodiment.

FIG. 15 is a figure that compares the corrected picture signals generated by the conventional image processing apparatus, and shows the corrected image signal F9 in the present embodiment.

The white region of the corrected image signal F9 in the present embodiment is wider than the white region in the corrected image signal G9 generated by a conventional image processing apparatus 800, is narrower than the corrected image signal T9 generated by the conventional image processing apparatus 900, and possesses an approximately equal width to the white region of the image signal F1.

Note that the waveform of the corrected image signal G9 does not have an intersection point which intersects with the waveform of the image signal F1 in the contour region A1. Further, the waveform of the corrected image signal T9 has intersection points which intersect with the image signal F1 in the contour region A1, however, the waveform of the corrected image signal T9 is bordered by the respective waveforms of the image signal F1 and the corrected image signal T9, and the areas of the two regions which overlap the above intersection points become equal to one another.

Figure 16:
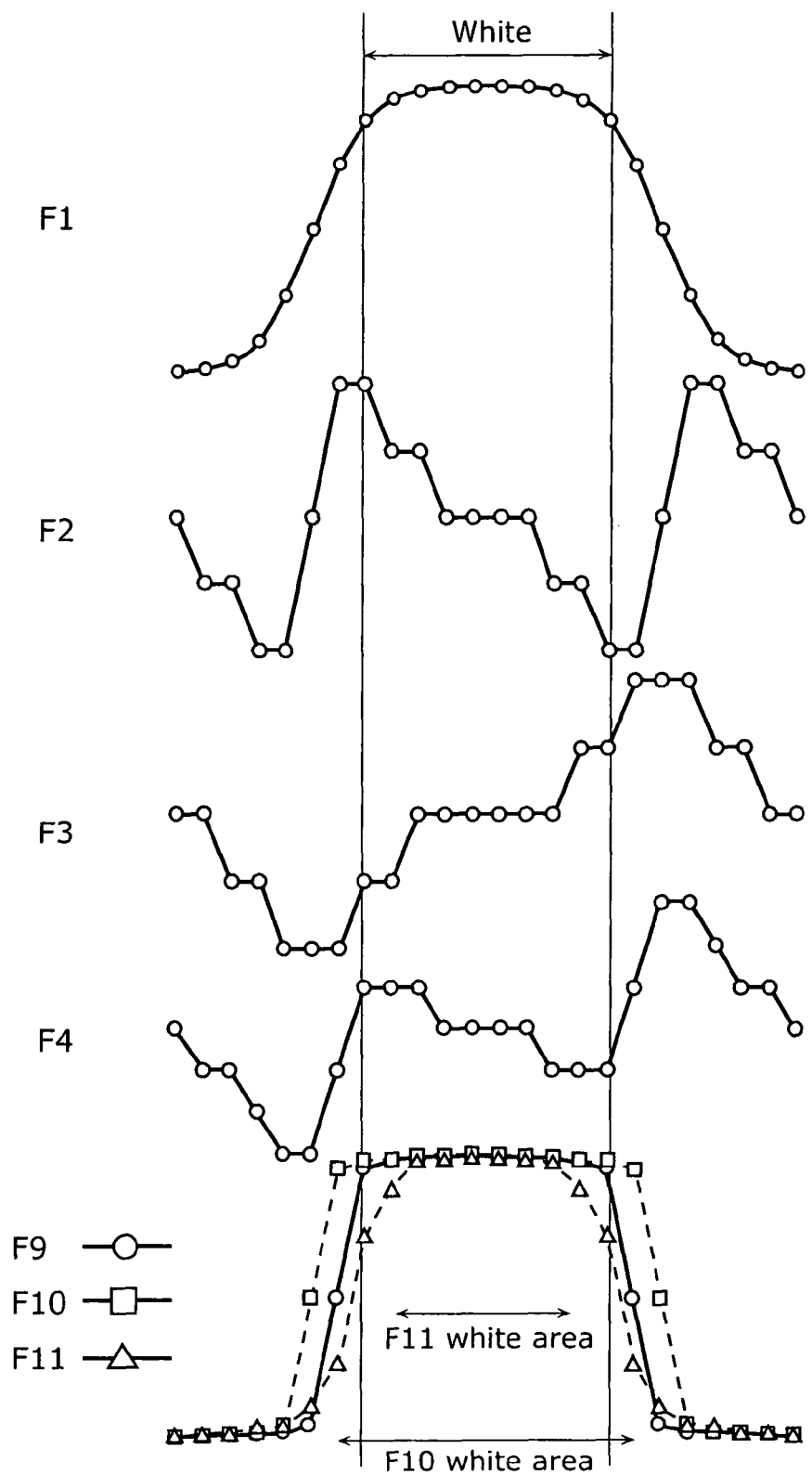
FIG. 16 is a diagram which shows each signal generated based on the image signal.

FIG. 16 is a diagram which shows each signal generated based on the image signal F1.

The image processing apparatus 100 in the present embodiment acquires the image signal F1 according to FIG. 16, and generates the steepness signal F2 and the shift signal F3 based on the image signal F1. The image processing apparatus then generates the contour correction control signal F4 by integrating the steepness signal F2 and the shift signal F3.

The image generation unit 140 of the image processing apparatus 100 then generates the corrected image signal F9 by correcting the image signal F1 according to the contour correction control signal F4.

Also, in the present embodiment it is possible to adjust the corrected image signal F9, generated by the image generation unit 140, by adjusting the gain for the control amount adjustment unit 123 and 116, which are included respectively in the steepening amount calculation unit 110 and the contour shift amount calculation unit 120. Accordingly, it is possible to freely adjust the difference between the area S1 and the area S2 in the contour region A1 and the difference between the area S3 and the area S4 in the contour region A2.

In other words, the image processing apparatus 100 in the present embodiment can generate the corrected image signals F9, F10 and F11, which express images in which the size of the white-colored regions are different, by adjusting the gain of the control amount adjustment unit 123 and 116, and can adjust the region to an appropriate size desired by the user.

Figure 17:
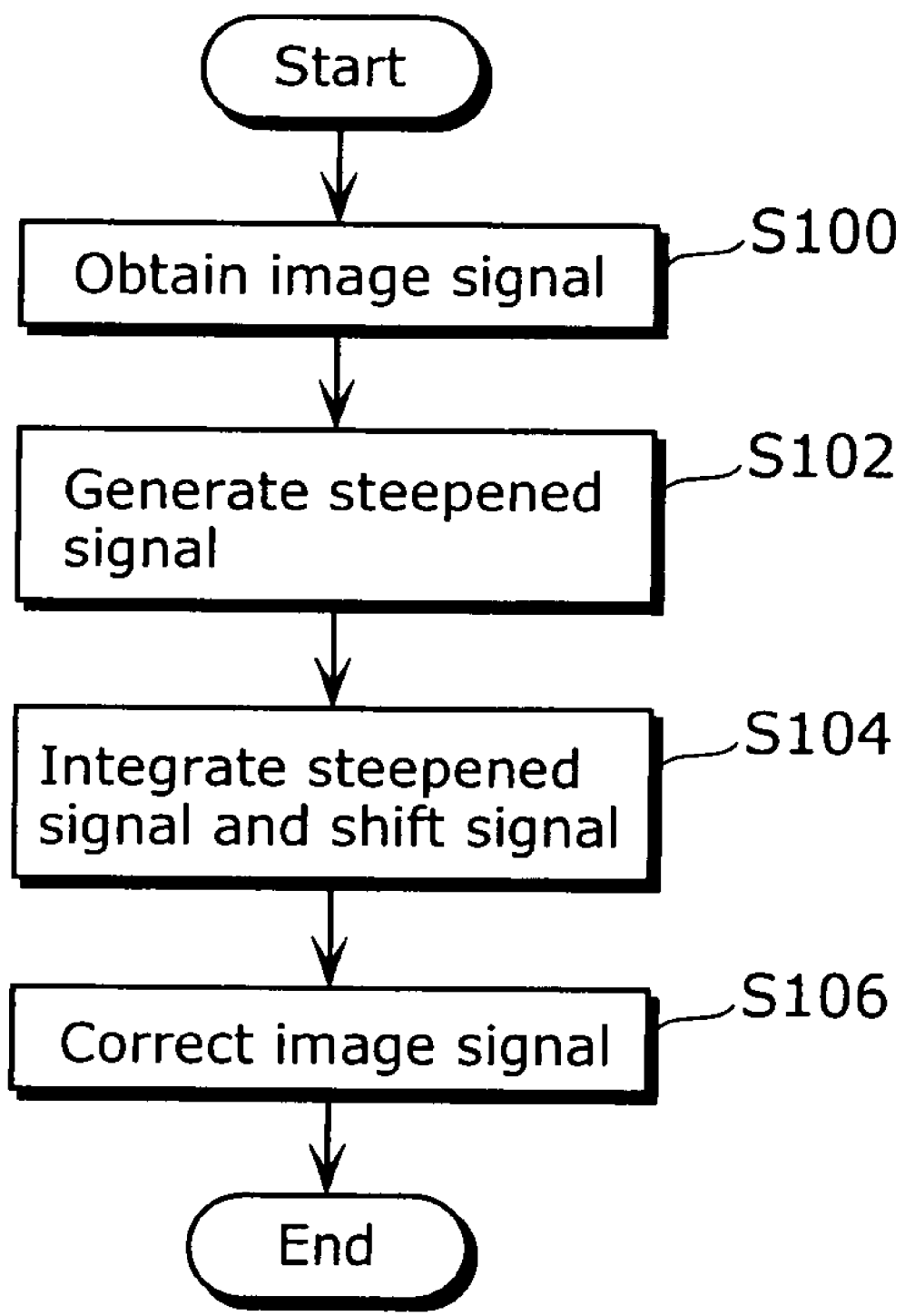
FIG. 17 is a flowchart that shows the operations of the image processing apparatus in the present embodiment.

FIG. 17 is a flowchart that shows the operations of the image processing apparatus 100 in the present embodiment.

The image processing apparatus 100 first acquires the image signal F1 (Step S100). The image processing apparatus 100 then generates the steepness signal F2 and the shift signal F3 based on the image signal F1 acquired (Step S102).

Next, the image processing apparatus 100 generates the contour correction control signal F4 by integrating the slope signal F2 and the shift signal F3 which are generated in Step S102 (Step S104).

The image processing apparatus 100 then corrects the image signal F1 according to the contour correction control signal F4 generated in Step S104 and as a result generates the corrected image signal F9 (Step S106).

In this way, since the waveform of the image signal F1 intersects with the corrected image signal F9 in the contour region in the present embodiment, it is possible to steepen the waveform of the corrected image signal F9 more than the waveform of the corrected image signal G9 conventionally generated by primary differentiation alone and as a result, the contour can be sharpened. Further, since the areas of the two regions bordered by both of the waveforms in the contour region are different, it is possible to approach the size of the white-colored region indicated by the image signal F1 by shrinking the size of the white-colored region expressed by the corrected image signal F9 to a size less than the white-colored region expressed by the corrected image signal T9 generated by secondary differentiation up to this point. As a result, it is possible to sharpen the contours at a relevant position. Therefore, displayed items such as a white column and a white letter, shown by the image signal F1, thicken excessively without dividing, and the displayed items can be displayed with contrast.

(Modification)

Below, a modification for the image processing apparatus in the present embodiment will be presented.

Figure 18:
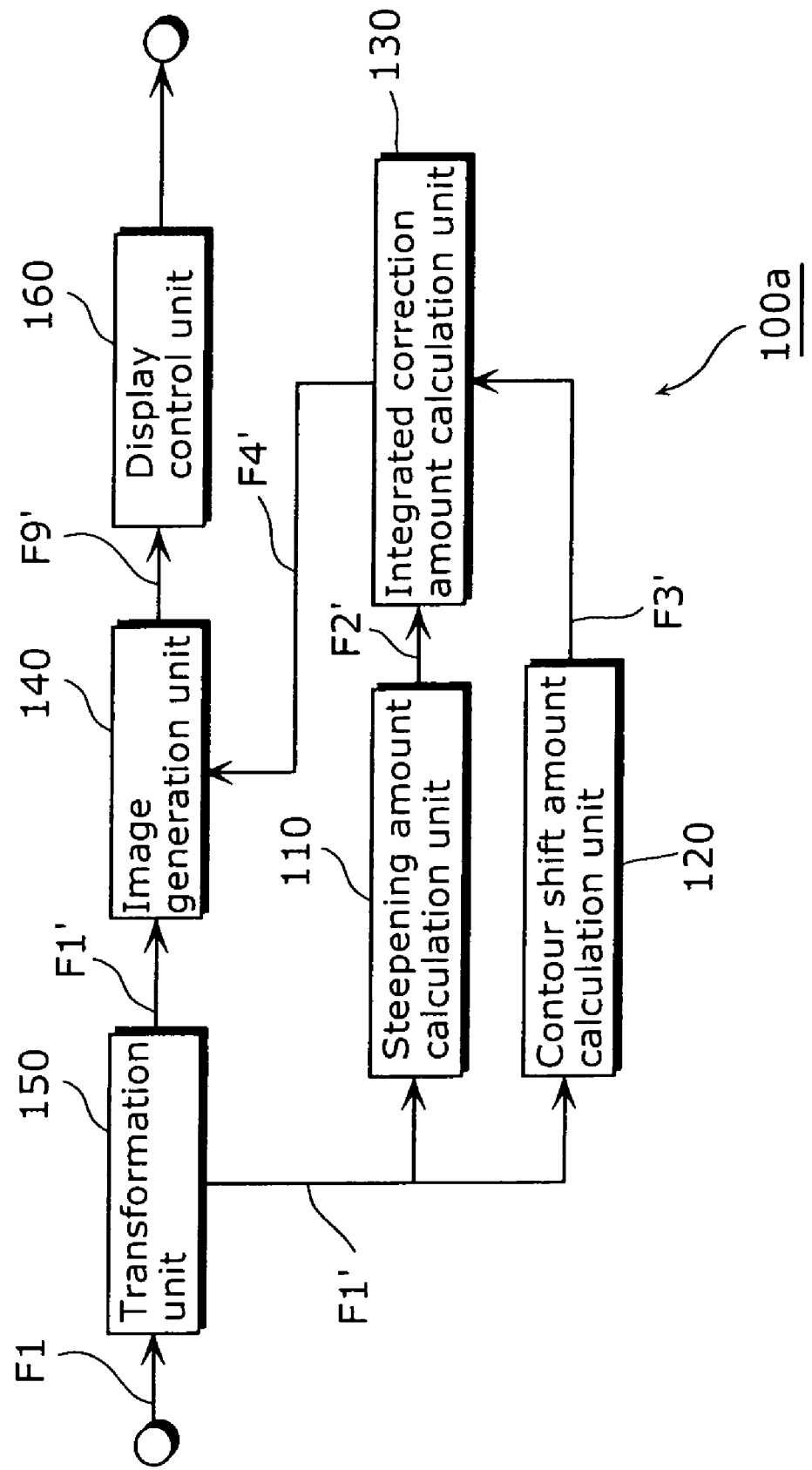
FIG. 18 is a functional block diagram of the image processing apparatus according to the modification of the present embodiment.

FIG. 18 is a functional block diagram of the image processing apparatus according to the present modification.

An image processing apparatus 100a according to the present modification is an apparatus that generates a corrected image signal F9 with a higher pixel precision than the pixel precision of an image signal F1, and includes the steepening amount calculation unit 110, the contour shift amount calculation unit 120, the integrated correction amount calculation unit 130 in the embodiment above, as well as the image generation unit 140, a transformation unit 150 and the display control unit 160.

The transformation unit 150 acquires the image signal F1 and transforms the image signal F1 into a transformed image signal F1 in order to increase the pixel accuracy of the image signal F1 by three times. For example, when the image signal F1 shows the value of each pixel for each horizontal position, the transformation unit 150 interpolates the space between each pixel and generates the transformed image signal F1 with three times the pixel accuracy in a horizontal direction. Note that among the methods for transforming the image signal F1 into the transformed image signal F1, there is the conventional expansion technique of, for example, linear interpolation and so on. Preferably, the picture signal F1 may be changed into the transformed image signal F1 using methods such as the cubic interpolation method and methods which add high frequency elements.

The steepening amount unit 110 acquires the transformed image signal F1 and executes the same operation and performs the same processes as above on the image signal F1. As a result, the steepening amount calculation unit 110 generates and outputs the steepness signal F2.

The contour shift amount calculation unit 120 acquires the transformed image signal F1 and performs the same process that was performed on the image signal F1 on the transformed image signal F1.

As a result, the contour shift amount calculation unit 120 generates a shift signal F3. The integrated correction amount calculation unit 130 acquires the steepness signal F2 and the shift signal F3, and performs the same processes as those performed above on the steepness signal F2 and the shift signal F3, on the steepness signal F2 and the shift signal F3. As a result, the integrated correction amount calculation unit 130 generates and outputs the contour correction control signal F4.

The image generation unit 140 acquires the contour correction control signal F4 and corrects the transformed image signal F1 according to the contour correction signal F4. As a result, the image generation unit 140 generates and outputs the corrected signal F9, with three times the pixel accuracy of the corrected image signal F9.

The display control unit 160 acquires the corrected image signal F9 and makes a display device display an image in which the corrected image signal F9 is expressed, while preserving the pixel accuracy above, the device utilizing a sub-pixel structure such as an LCD panel and a PDP (Plasma Display Panel). This display device features, for example, one of the three light-emitting devices of RGB as a sub-pixel.

Note that a method to improve the pixel accuracy of the image processing apparatus 100a is for example implemented utilizing the method published in Japanese Patent Laid-Open No. 2002-318561 bulletin.

In this way, in the present modification, since the pixel accuracy of the image shown by the corrected image signal improves to more than the pixel accuracy of the image signal F1, it is possible to further sharpen the contours of the image shown by the image signal F1.

Above, the embodiments as well as the modifications of the present invention are presented, but the present invention is not limited to these.

For example, the image processing apparatus 100 and the image processing apparatus 100a in the present invention and in the present modifications may be achieved in the form of an integrated circuit or a Large Scale Integrated (LSI) circuit. Also, the image processing apparatus 100 and the image processing apparatus 100a can be achieved respectively in one integrated circuit, or a part of each apparatus also can be achieved in one integrated LSI. The name used here is LSI, but the integrated circuit may also be called IC, system LSI, super LSI, or ultra LSI.

In the present embodiment, the control amount adjustment unit 123 and the control amount adjustment unit 116 are included respectively in the contour shift amount calculation unit 120 and the steepening amount calculation unit 110, and the size of the contour position, i.e. of the white region, is adjusted by adjusting the gain of the shift signal F3 and the steepness signal F2, and the integrated correction amount calculation unit 130 may be set to weight the shift signal F3 and the steepness signal F2 respectively. The integrated correction amount calculation unit 130 generates the corrected picture signal F9 by adding the weighted shift signal F3 and the steepness signal F2. By weighting in this way, it is possible to flexibly adjust the contour positions i.e. the size of the white area, as above. Further, in this case, the smoothness of the corrected image signal can be freely regulated and a smooth and steep corrected image signal can be generated.

Also, the image generation unit 140 weights the acquired value shown by the image signal F1 and may correct the weighted image signal F1 according to the contour correction control signal F4 outputted from the integrated correction amount calculation unit 130. By weighting the image signal F1 in this way, it is possible to flexibly adjust the contour positions, as above. Further, in this case, the smoothness of the corrected image signal can be freely regulated and a smooth and a steep corrected image signal can be generated.

Also, in the present embodiments, the shift signal F3 is generated by the contour shift amount calculation unit 120 performing primary differentiation, the steepness signal F2 is generated by the steepening amount calculation unit 110 performing secondary differentiation, and the reverse, the contour shift amount calculation unit 120 generates the shift signal F3 by performing a secondary differentiation and the steepening amount calculation unit 110 generates the steepness signal F2 by performing a primary differentiation. Also, the contour shift amount calculation unit 120 and the steepening amount calculation unit 110 may generate the shift signal F3 and the steepness signal F2 according to the polynomial of the primary derivative and the second derivative respectively.

Industrial Applicability

The present invention performs the effect of sharpening contours at an appropriate position, and, for example, may be applied to enhanced image quality technologies such as a television set.

The invention claimed is:

1. An image processing apparatus which generates a corrected image signal that shows corrected contours of an image, by correcting contours of an image represented by an image signal, said apparatus comprising:
a signal obtainment unit operable to obtain the image signal; and
a correction unit operable to generate the corrected image signal in such a way that there is an intersection with waveforms, and that there are two regions with different areas bordered by the waveforms which overlap at the intersection point, the waveforms expressing changes in each value in image spaces displayed by the image signal and the corrected image signal respectively, when a waveform which expresses changes in the differential values of the image signal relative to the image spaces is symmetrical in a contour region of the image shown by the image signal,
wherein said correction unit includes:
a shift amount calculation unit operable to calculate a shift amount for shifting the waveform in the contour region of the image signal;
a steepening amount calculation unit operable to calculate a steepening amount for steepening the waveform in the contour region of the image signal;
an integration unit operable to calculate a correction amount for correcting the image signal of the contour region by integrating the shift amount and the steepening amount calculated by said shift amount calculation unit and said steepening amount calculation unit; and
a generation unit operable to generate the corrected image signal by correcting the image signal in the contour region by the correction amount calculated by said integration unit.

2. The image processing apparatus according to claim 1, wherein said shift amount calculation unit is further operable to adjust a gain of the calculated shift amount,
said steepening calculation unit is further operable to adjust a gain of the calculated steepening amount, and
said integration unit is operable to calculate the correction amount by integrating the gain-adjusted shift amount and steepening amount.

3. The image processing apparatus according to claim 1, wherein said integration unit is operable to calculate the correction amount by weighting the shift amount and the steepening amount, and adding together the weighted shift amount and steepening amount.

4. The image processing apparatus according to claim 1, wherein said generation unit is operable to generate the corrected image signal by weighting each value shown by the image signal and correcting the weighted image signal.

5. The image processing apparatus according to claim 1, wherein said shift amount calculation unit is operable to perform at least one of a primary differentiation and a secondary differentiation against each value in the image space shown by the image signal, and to calculate the shift amount based on the result of the calculation.

6. The image processing apparatus according to claim 1, wherein said steepening amount calculation unit is operable to perform at least one of a primary differentiation and a secondary differentiation calculation against each value in the image space shown by the image signal, and to calculate the steepening amount based on the result of the calculation.

7. The image processing apparatus according to claim 1, wherein said shift amount calculation unit is operable to calculate the shift amount per position in the image space,
said steepening amount calculation unit is operable to calculate the steepening amount per position in the image space, and
said integration unit is operable to calculate the correction amount for each position in the image space by adding up a shift amount for each position and a steepening amount for a separate position distanced by the shift amount for each position.

8. The image processing apparatus according to claim 1, wherein the image signal expresses a value related to the image per position in the image space,
the corrected image signal expresses a corrected value related to the image per position in the image space, and
said generation unit is operable to generate the corrected picture signal for each position in the image space in such a way that a value in the image signal at a separate position distanced by the correction amount for a position becomes the corrected value at the position.

9. The image processing apparatus according to claim 1, wherein said image processing apparatus further comprises:
a transformation unit operable to transform the image signal obtained by said signal obtainment unit such that a whole number multiple of a pixel accuracy for the image represented by the image signal is obtained; and
a display control unit operable to make the corrected image signal generated by said correction unit display in a display unit which groups an whole number multiple of light-emission elements as a single pixel, based on the transformed image signal.

10. An image processing method for generating a corrected image signal that shows corrected contours of an image, by correcting contours of an image represented by an image signal, said method comprising:
a signal obtainment step of obtaining the image signal; and
a correction step of generating the corrected image signal in such a way that there is an intersection between waveforms, and that there are two regions with different areas bordered by the waveforms which overlap at the intersection point, the waveforms expressing changes in each value in image spaces displayed by the image signal and the corrected image signal respectively, when a waveform which expresses changes in the differential values of the image signal relative to the image spaces is symmetrical in a contour region of the image shown by the image signal, wherein said correction step includes:
a shift amount calculation step of calculating a shift amount for shifting the waveform in the contour region of the image signal;
a steepening amount calculation step of calculating a steepening amount for steepening the waveform in the contour region of the image signal;
an integration step of calculating a correction amount for correcting the image signal of the contour region by integrating the shift amount and the steepening amount calculated in said shift amount calculation step and said steepening amount calculation step; and
a generation step of generating the corrected image signal by correcting the image signal in the contour region by the correction amount calculated in said integration step.

11. A non-transitory computer-readable recording medium having stored thereon an image processing program for generating a corrected image signal that shows corrected contours of an image, by correcting contours of an image represented by an image signal, said program causing a computer to execute:
a signal obtainment step of obtaining the image signal; and
a correction step of generating the corrected image signal in such a way that there is an intersection between waveforms, and that there are two regions with different areas bordered by the waveforms which overlap at the intersection point, the waveforms expressing changes in each value in image spaces displayed by the image signal and the corrected image signal respectively, when a waveform which expresses changes in the differential values of the image signal relative to the image spaces is symmetrical in a contour region of the image shown by the image signal, wherein said correction step includes:
a shift amount calculation step of calculating a shift amount for shifting the waveform in the contour region of the image signal;
a steepening amount calculation step of calculating a steepening amount for steepening the waveform in the contour region of the image signal;
an integration step of calculating a correction amount for correcting the image signal of the contour region by integrating the shift amount and the steepening amount calculated in said shift amount calculation step and said steepening amount calculation step; and
a generation step of generating the corrected image signal by correcting the image signal in the contour region by the correction amount calculated in said integration step.

* * * * *